(12) United States Patent
Retzker et al.

(10) Patent No.: US 12,555,014 B1
(45) Date of Patent: Feb. 17, 2026

(54) QUANTUM GATE PROTOCOL FOR THE EXECUTION OF SPIN LOCKING ONTO SUPERCONDUCTING QUBIT ARCHITECTURES

(71) Applicant: Amazon Technologies, Inc., Seattle, WA (US)

(72) Inventors: Alex Retzker, Pasadena, CA (US); Amit Rotem, Pasadena, CA (US)

(73) Assignee: Amazon Technologies, Inc., Seattle, WA (US)

( * ) Notice: Subject to any disclaimer, the term of this patent is extended or adjusted under 35 U.S.C. 154(b) by 903 days.

(21) Appl. No.: 17/810,201

(22) Filed: Jun. 30, 2022

(51) Int. Cl.
*G06N 10/40* (2022.01)
*G06N 10/60* (2022.01)
*H03K 17/92* (2006.01)
*H03K 19/195* (2006.01)

(52) U.S. Cl.
CPC ............ *G06N 10/40* (2022.01); *G06N 10/60* (2022.01); *H03K 17/92* (2013.01); *H03K 19/195* (2013.01)

(58) Field of Classification Search
CPC ........ G06N 10/40; G06N 10/60; H03K 17/92; H03K 19/195
See application file for complete search history.

(56) References Cited

U.S. PATENT DOCUMENTS

| 11,163,209 | B2 | 11/2021 | LaHaye et al. | |
|---|---|---|---|---|
| 11,244,241 | B1 * | 2/2022 | Gambetta | G06N 10/00 |
| 2019/0156236 | A1 * | 5/2019 | Bishop | H03K 3/013 |
| 2021/0279624 | A1 * | 9/2021 | Oliver | G06N 10/40 |
| 2024/0338583 | A1 * | 10/2024 | Zwierlein | G21K 1/003 |
| 2025/0232204 | A1 * | 7/2025 | Wang | G06N 10/70 |

OTHER PUBLICATIONS

Klimov, Paul V., et al. "The snake optimizer for learning quantum processor control parameters." arXiv preprint arXiv:2006.04594 (2020). (Year: 2020).*

Mundada, Pranav, et al. "Suppression of qubit crosstalk in a tunable coupling superconducting circuit." Physical Review Applied 12.5 (2019): 054023. (Year: 2019).*

(Continued)

*Primary Examiner* — Andrew T Chiusano
(74) *Attorney, Agent, or Firm* — Alexander A. Knapp; Kowert, Hood, Munyon, Rankin & Goetzel, P.C.

(57) ABSTRACT

A system and method for inducing spin locking onto superconducting qubits, via a control drive, during performance of a quantum gate between the superconducting qubits is described. Spin locking may prolong the coherence times of the superconducting qubits involved in the gate, therefore reducing the risk that a fault occurs due to interference by noise in the environment. In order to induce spin locking, pulses may be directed at the superconducting qubits for the duration of the gate. The pulses may be determined and optimized by optimal coherence control methods and applied using a control drive. The pulse profiles may be determined in a manner that is specific to the given gate, to the superconducting qubits involved in the gate, and to the quantum hardware upon which the superconducting qubits and the gate are implemented.

20 Claims, 14 Drawing Sheets

(56) References Cited

OTHER PUBLICATIONS

Abdurakhimov, Leonid V., et al. "Driven-state relaxation of a coupled qubit-defect system in spin-locking measurements." Physical Review B 102.10 (2020): 100502. (Year: 2020).*

Sete, Eyob A., et al. "Parametric-resonance entangling gates with a tunable coupler." Physical Review Applied 16.2 (2021): 024050. (Year: 2021).*

Zuk, Ido, et al. "Robust gates with spin-locked superconducting qubits." Physical Review Research 6.1 (2024): 013217. (Year: 2024).*

Ding, Yongshan, et al. "Systematic crosstalk mitigation for superconducting qubits via frequency-aware compilation." 2020 53rd Annual IEEE/ACM International Symposium on Microarchitecture (MICRO). IEEE, 2020. (Year: 2020).*

Arute, Frank, et al. "Quantum supremacy using a programmable superconducting processor." Nature 574.7779 (2019): 505-510. (Year: 2019).*

U.S. Appl. No. 17/548,383, filed Dec. 10, 2021, Aleksander Marek Kubica, et al.

Cywinski, R. M. Lutchyn, C. P. Nave, and S. Das Sarma, "How to Enhance Dephasing Time in Superconducting Qubits", Phys. Rev. B 77, 174509 (2008), arXiv:0712.2225v2, pp. 1-12.

J. Werschnik and E. K. U. Gross, "Quantum optimal control theory", Journal of Physics B: Atomic, Molecular and Optical Physics 40, pages R175-R211, IOP Publishing, (2007).

D. F. James and J. Jerke, "Effective Hamiltonian theory and its applications in quantum information", Canadian Journal of Physics 85, 625 (2007), arXiv:0706.1090, pp. 1-5.

J. Zhang, J. Vala, S. Sastry, and K. B. Whaley, "Minimum Construction of Two-Qubit Quantum Operations", Phys. Rev. Letters vol. 93, No. 2, pp. 020502-1 through 020502-4, (2004).

* cited by examiner

Determine a pulse profile for a plurality of pulses to be applied, by a drive, on quantum hardware comprising superconducting qubits during performance of a gate such that spin locking is induced for a set of superconducting qubits of the superconducting qubits of the quantum hardware between which the gate is performed
200

Determine, via optimal coherence control methods, a subset of frequency components producible by the drive that cause leakage outside of respective code spaces of the set of superconducting qubits
202

Exclude the subset of the frequency components from the pulse profile
204

Perform the gate, wherein performing the gate comprises applying the plurality of pulses having the determined pulse profile to induce the spin locking
206

FIG. 2 duration of the gate 900

QUANTUM GATE PROTOCOL FOR THE EXECUTION OF SPIN LOCKING ONTO SUPERCONDUCTING QUBIT ARCHITECTURES

BACKGROUND

Quantum computing utilizes the laws of quantum physics to process information. Quantum physics is a theory that describes the behavior of reality at the fundamental level. It is currently the only physical theory that is capable of consistently predicting the behavior of microscopic quantum objects (e.g., particles) like photons, molecules, atoms, and electrons.

A quantum computing device is a device that utilizes quantum mechanics to allow one to write, store, process and read out information encoded in quantum states, e.g., the states of quantum objects. A quantum object is a physical object that behaves according to the laws of quantum physics. The state of a physical object is a description of the object at a given time.

In quantum mechanics, the state of a two-level quantum system, or simply, a qubit, is a list of two complex numbers, where the absolute sum of the complex numbers must sum to one. Each of the two numbers is called an amplitude, or quasi-probability. The square of an amplitude gives a potentially negative probability. Hence, each of the two numbers correspond to the square root that event zero and event one will happen, respectively. A fundamental and counterintuitive difference between a probabilistic bit (e.g., a traditional zero or one bit) and the qubit is that a probabilistic bit represents a lack of information about a two-level classical system, while a qubit contains maximal information about a two-level quantum system.

Quantum computing devices are based on such quantum bits (qubits), which may experience the phenomena of "superposition" and "entanglement." Superposition allows a quantum system to be in multiple states at the same time. For example, whereas a classical computer is based on bits that are either zero or one, a qubit may be both zero and one at the same time, with different probabilities assigned to zero and one. Entanglement is a strong correlation between quantum particles, such that the quantum particles are inextricably linked in unison even if separated by great distances.

There are different types of qubits that may be used in quantum computers, each having different advantages and disadvantages. For example, some quantum computers may include qubits built from superconductors, trapped ions, semiconductors, photonics, etc. Each may experience different levels of interference, errors and decoherence. Also, some may be more useful for generating particular types of quantum circuits or quantum algorithms, while others may be more useful for generating other types of quantum circuits or quantum algorithms.

BRIEF DESCRIPTION OF THE DRAWINGS

FIG. 2 is a flowchart illustrating a process of determining pulses having a pulse profile that induce spin locking during performance of a gate between superconducting qubits implemented on quantum hardware, according to some embodiments.

Figure 1A:
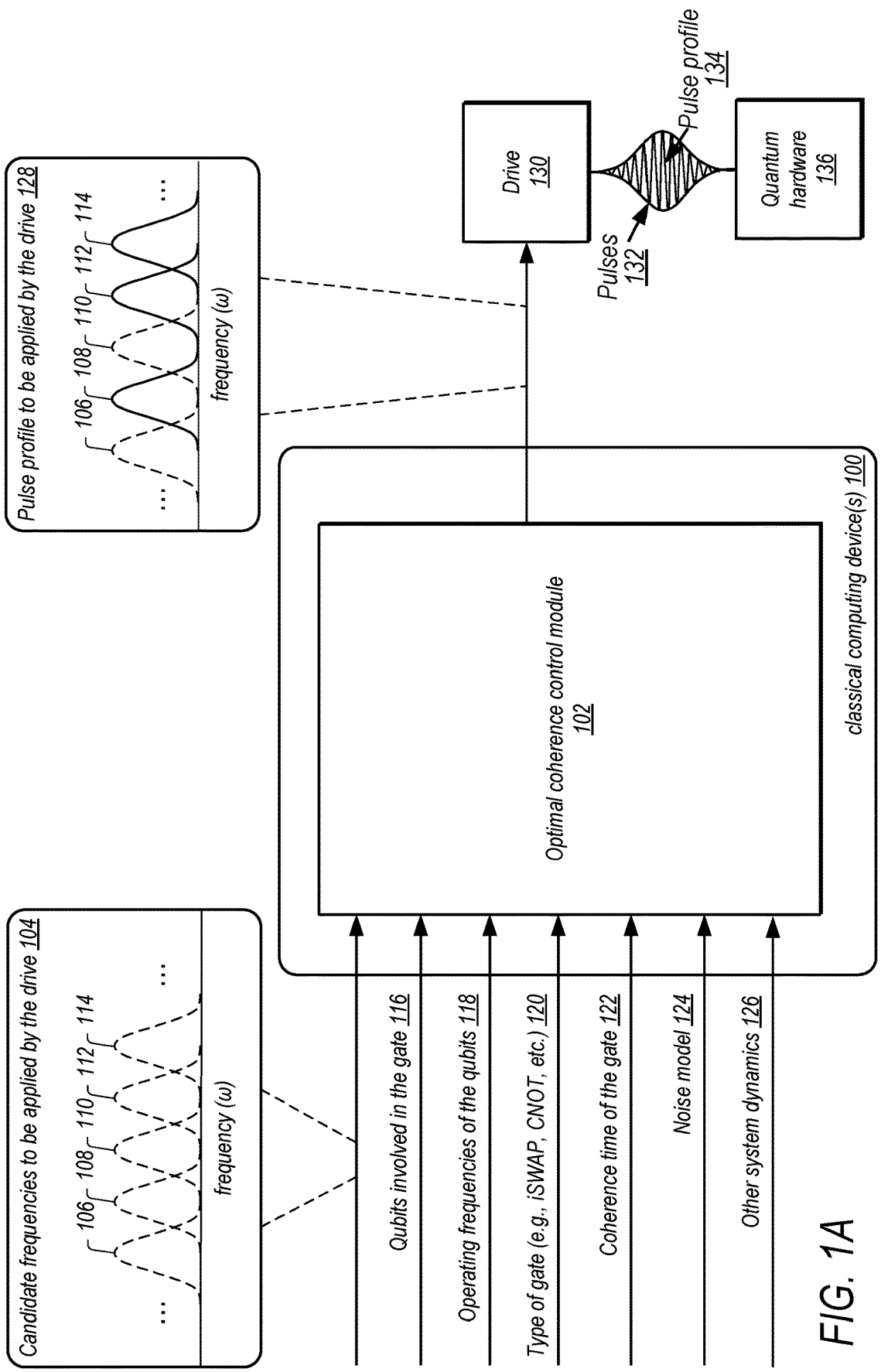
FIG. 1A illustrates an example of a system configured to determine pulses having a pulse profile for a drive that induce spin locking during performance of a given gate between superconducting qubits implemented on quantum hardware, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and systems for implementing a quantum gate protocol that utilizes spin locking in order to extend coherence times of superconducting qubits and mitigate the adverse effect of noise during performance of a gate. Gate fidelity remains one of the challenges to the scientific community centered around quantum computing and the development of a universal and fault-tolerant quantum computer. In order to increase gate fidelity, it may be advantageous to extend coherence times of superconducting qubits during performance of a gate. This may reduce the chance of a fault occurring during the performance of the gate, according to some embodiments. Coherence times of superconducting qubits during performance of a gate may be optimized by using optimal coherence control methods, as described herein. However, in order to describe such optimizations, it is useful to first consider noise that a given two-level system (e.g., superconducting qubit) may be subjected to is first described. Note that superconducting qubits may be implemented as two-level systems with a first state (e.g., a ground state) being the first level of the two-level system and a second state (e.g., a first excited state) being the second level of the two-level system.

For example, a two-level system (e.g., superconducting qubit) with a given energy gap (e.g., between the first and second levels of the two-level system) may have an energy shift in said energy gap due to noise (e.g., external noise, stochastic noise due to the surrounding environment of the two-level system, etc.). In some embodiments, this may be described by the following Hamiltonian, $$\mathcal{H} = \frac{\omega + \delta}{2}\sigma_z,$$

wherein $\omega$ is a given energy gap of the two-level system (e.g., superconducting qubit), and $\delta$ is the energy shift, which is assumed to be constant (e.g., does not vary with time) in the given example. Considering an evolution of state (e.g., $\|\uparrow_x\rangle$) within the two-level system (e.g., superconducting qubit), the coherence time of the two-level system may be defined by a duration of time over which the phase of a state significantly changes from the predicted value (e.g., $T_\phi = \delta_{rms}^{-1}$).

The coherence time of the two-level system (e.g., superconducting qubit) may be prolonged by utilizing a control field, according to some embodiments. A control field may refer to the application of one or more pulses that are directed, via a drive, at the two-level system(s) (e.g., superconducting qubits) involved in a given gate. The superconducting qubits may be "controlled" or manipulated based on one or more characteristics of the pulses that establish the control field. Previously, such a control field aimed at rapidly flipping the state of the superconducting qubits in order to prolong coherence time. This was accomplished via a pulse sequence in which pulses caused the state of the qubit to be rapidly flipped (e.g., by applying $U_\pi = \sigma_y$ to the below equation) at time t\2 during performance of the given gate, which may have then partially or completely compensated for the noise at time t by the following:

$$U(t,0) = \exp(-i\mathcal{H}\, t/2)\sigma_y \exp(-i\mathcal{H}\, t/2) = \sigma_y.$$

For a time-dependent energy shift (e.g., an energy shift $\delta$ that does vary with time) this result was approximately valid as long as the coherence time of the noise was long enough.

Furthermore, multiple pulses could be applied within the overall pulse sequence in order to further this goal. However, by applying multiple pulses in the pulse sequence with increasingly small space between them, the assumption of rapidly flipping the state of the qubit is no longer valid, creating a limitation on this technique.

In order to overcome these problems, continuous pulses, rather than a pulse sequence, that are directed at such two-level systems (e.g., superconducting qubits) may be instead utilized such that spin locking is induced. Spin locking, which is further described in the following paragraphs, refers to a continuous form of a spin echo technique. In some embodiments, spin locking may prolong a coherence time of a two-level system (e.g., superconducting qubit) without having the limiting factors of limiting the number of pulses in the pulse sequence while also maintaining the assumption that the state of the qubit is rapidly flipping for the duration of the gate. Spin locking makes use of a control field in order to manipulate superconducting qubits during performance of a gate, wherein the control field is established with continuous pulses rather than a pulse sequence.

Figure 4A:
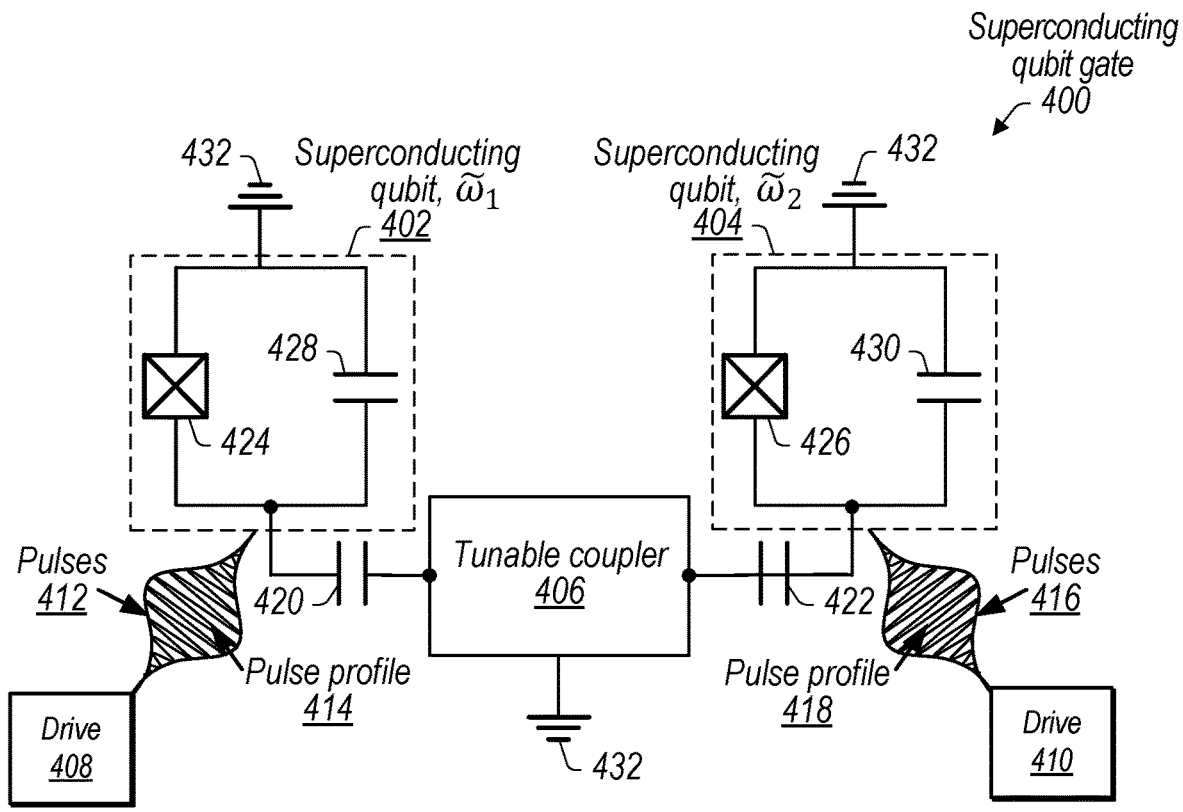
FIG. 4A illustrates an example of a two-qubit gate which is driven by a spin-locking drive, according to some embodiments.
Figure 4B:
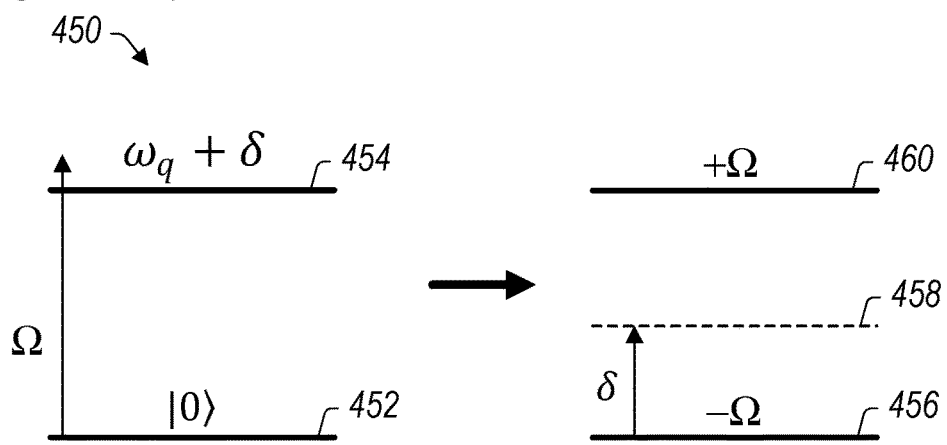
FIG. 4B illustrates an example of a code space mapping for a superconducting qubit, according to some embodiments.

In some embodiments in which the application of spin locking on the two-level system (e.g., superconducting qubit) is utilized, a two-level system with a "noisy energy gap" (e.g., an energy gap with a given energy shift of $\delta$) and a drive that applies the given control field may be described by $$\mathcal{H} = \frac{\omega + \delta}{2}\sigma_z + \Omega\cos(\omega t)\,\sigma_x,$$

wherein $\omega$ is the given energy gap of the two-level system (e.g., superconducting qubit), $\delta$ is the time dependent fluctuation from the given energy gap, and $\Omega$ is the Rabi frequency of the drive (see the description for FIG. 4B herein). Moving to the interaction picture (e.g., a change of basis, referring to an alternative representation of the system dynamics) with respect to the drive, and taking the rotating wave approximation (RWA), the dynamics may be given by $$\mathcal{H}_I = \frac{\sigma}{2}\sigma_z + \frac{\Omega}{2}\sigma_x.$$

In some embodiments, $$\frac{\Omega}{2}\sigma_x$$

may be identified as the Hamiltonian that defines the dynamics of the given qubit and the eigenstates of the qubit as the dressed states (e.g., eigenstates of $\mathcal{H}_I$, or the Hamiltonian in the interaction picture). In some embodiments, spin locking may, at least in part, be induced when $\delta$ does not have frequency components close to $\Omega$, which causes unintended transitions (e.g., those caused by noise) to be suppressed, and the effect of $$\frac{\delta}{2}\sigma_z$$

(e.g., noise) may then be reduced. The reduction of the effect of $$\frac{\delta}{2}\sigma_z$$

may be optimized through optimal coherence control methods described herein, according to some embodiments.

In some embodiments, optimization techniques may be used to shape the pulses such that they induce spin locking in order to ensure that the effect of noise during the performance of a given gate is reduced while avoiding unintended errors and/or faults to the two-level system(s) (e.g., due to population of the higher excited states outside of a code space of the qubit). For example, some embodiments described herein utilize optimal coherence control methods in order to prepare a pulse profile to be applied via pulses by a drive that induces spin locking during performance of a given gate. As described herein, optimal coherence control methods may refer to the process of optimizing the control of a target (e.g., two-level systems such as superconducting qubits) through the emission of one or more pulses that are optimized to induce spin locking while avoiding leakage outside of code spaces, and/or avoiding occupancies of higher energy state levels of the superconducting qubits.

In some embodiments, the direction of pulses onto the target (e.g., two-level systems such as superconducting qubits) may cause the target to be immersed in a "laser field" or "control field" which, when the pulses are carefully chosen, may promote or discourage certain properties. For example, the pulse profiles that are discussed herein may discourage leakage outside of given code spaces that are mapped to ground and excited states of superconducting qubits by inducing spin locking and combatting stochastic noise (e.g., external, unintended, or otherwise interfering noise) that may cause unintended excitations and/or annihilations other than the intended transition between the defined energy states defined in a given code space mapping. Such "noise-mitigating" pulses may therefore promote the successful transition of logical information between superconducting qubits through prolonged coherence times, according to some embodiments.

FIG. 1A illustrates an example of a system configured to determine pulses having a pulse profile for a drive that induce spin locking during performance of a given gate between superconducting qubits implemented on quantum hardware, according to some embodiments.

In some embodiments, a system configured to generate and provide a pulse profile for a spin locking drive may resemble the system described by FIG. 1A. Classical computing device(s) 100 may apply optimal coherence control module 102 in order to produce a pulse profile to be applied by the drive 128, where the pulse profile may then be provided to drive 130 in order to execute pulses having the determined pulse profile. In some embodiments, drive 130 may be configured to induce spin locking onto quantum hardware 136 via pulses 132 having pulse profile 134 during performance of a given gate implemented on quantum hardware 136, according to some embodiments.

Figure 11:
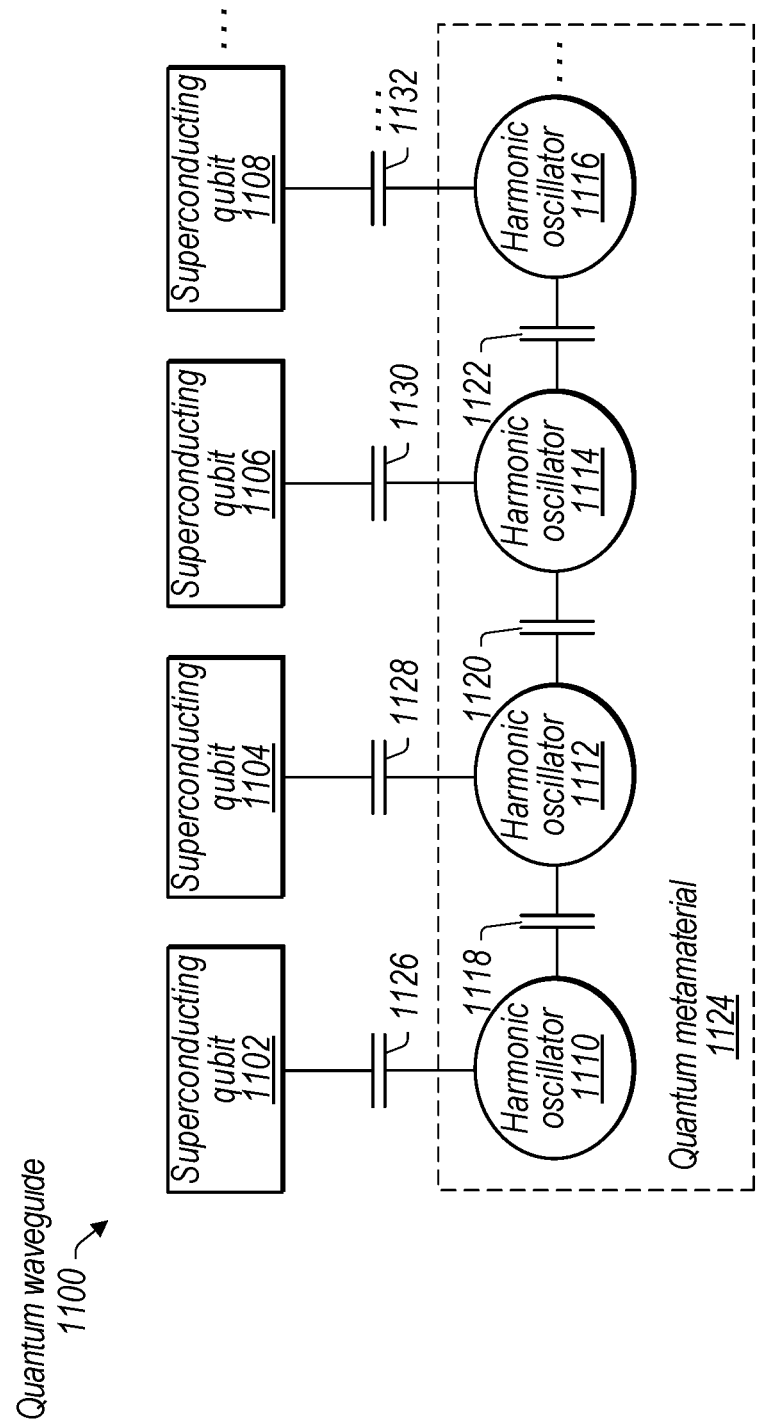
FIG. 11 illustrates an example of a quantum device comprising a quantum waveguide configuration which may be subjected to a spin locking drive during performance of a gate between superconducting qubits implemented using the quantum device, according to some embodiments.
Figure 12:
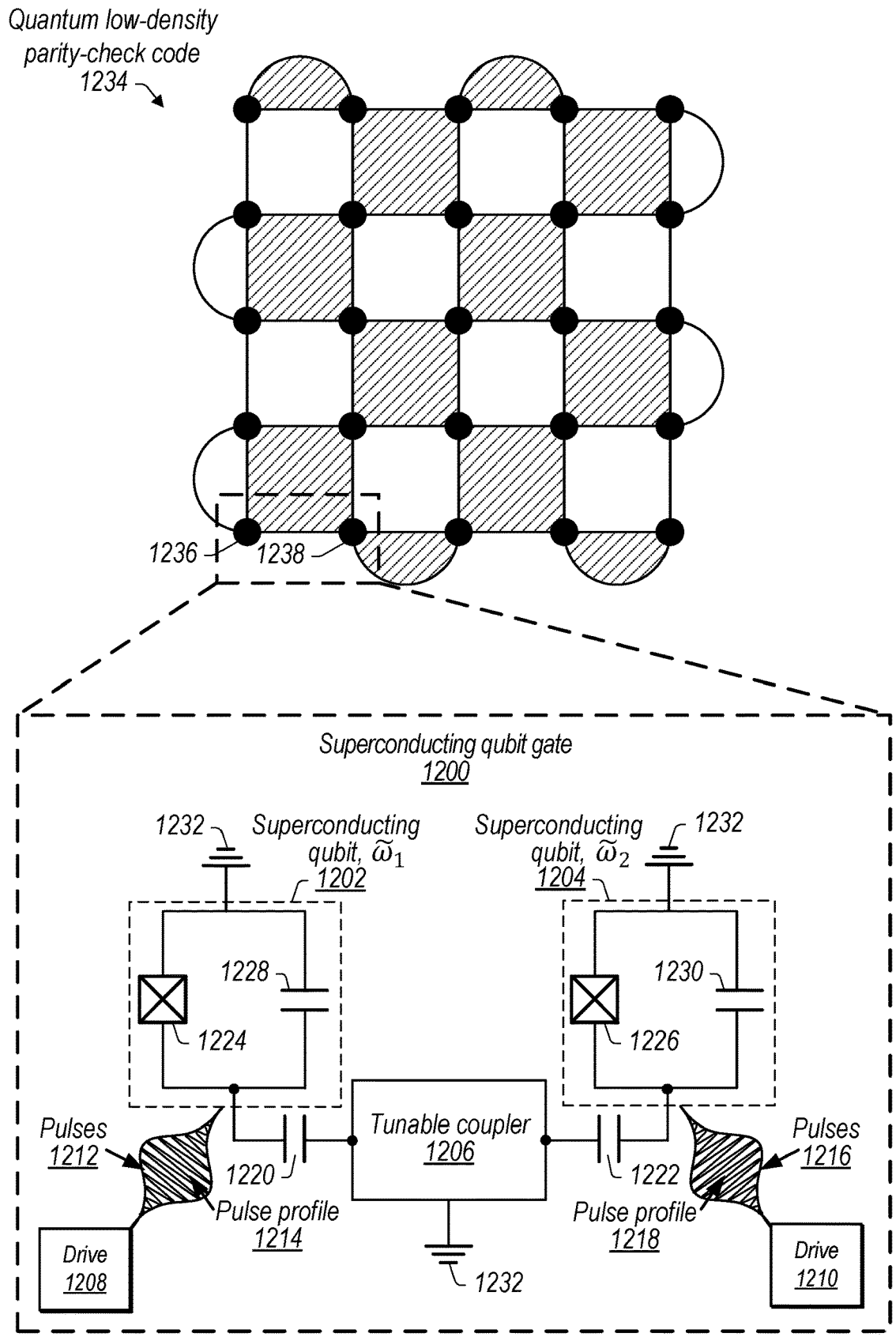
FIG. 12 illustrates a quantum low-density parity-check code configured to perform a gate that is implemented using a spin locking drive, according to some embodiments.

In some embodiments, quantum hardware 136 may comprise two or more superconducting qubits, such as transmons. Quantum hardware 136 may also comprise additional elements such as tunable couplers (e.g., resonators, harmonic oscillators, anharmonic oscillators, etc.), superconducting quantum interference devices (SQUIDs), and/or capacitors, according to some embodiments. Quantum hardware 136 may refer to a quantum device and/or a quantum computer, according to some embodiments. Example embodiments of quantum hardware 136 are shown in FIGS. 4A, 11, and 12. However, a person having ordinary skill in the art should understand that other implementations of quantum hardware 136 may similarly be subjected to a spin locking drive such as drive 130 using the methods and techniques described herein.

Quantum hardware 136 may also be configured to couple two or more superconducting qubits together such that a gate may be performed between said superconducting qubits, according to some embodiments. Such an example gate implementation is described in FIG. 4A. Examples of superconducting qubit gates may comprise Stark shift based gates, cross resonance based gates, and/or adiabatic hybridized gates in order to realize given quantum circuits. One or more gates may be implemented on quantum hardware 136 concurrently, such as during one or more rounds of syndrome measurements, in such embodiments in which quantum hardware 136 may comprise a low-density parity-check code such as low-density parity-check code 1234. In some embodiments, one or more gates on quantum hardware 136 may be implemented sequentially such as in part of a logical gate operation.

In some embodiments, drive 130 may resemble a microwave pulse source that may produce one or more generated waveforms, also referred to as wave packets and/or pulses, such as pulses 132, 1212, and 1216. Such pulses may be configured to have pulse profiles such as pulse profiles 134, 1214, and 1218 (e.g., one or more characteristics related to the frequency or frequencies comprised within a given wave packet, the amplitudes of the pulses, shapes of the pulses, the duration of the pulses, and/or one or more other pulse-related design configurations). Drive 130 may similarly resemble a microwave drive line, a pulsed laser source, an arbitrary waveform generator, or a source configured to emit laser pulses, according to some embodiments.

In some embodiments, drive 130 may be configured to "drive" or "control" a given gate between superconducting qubits implemented on quantum hardware 136 via pulses 132 having pulse profile 134 in such a way that spin locking of the superconducting qubits is induced. In some embodiments, drive 130 may resemble a continuous drive, wherein "continuous" may refer to the drive being configured to apply one or more pulses, such as those described herein, continuously for the duration of the given gate, according to some embodiments.

In some embodiments, optimal coherence control module 102 is configured to receive one or more inputs that may be relevant to the determination of a pulse profile to be applied by the drive 128. Optimal coherence control module 102 may be further configured to determine or receive one or more inputs that may be relevant to the determination of a pulse profile to be applied by the drive 128 (see also the description for FIG. 1B herein). Similarly, one or more inputs may be determined via classical computing device(s) 100, locally or remotely from optimal coherence control module 102, and then received by optimal coherence control module 102, according to some embodiments. In some embodiments, classical computing device(s) 100 may resemble classical computing device 1300 and/or the functionalities described herein in relation to classical computing device 1300.

Inputs to optimal coherence control module 102 may comprise candidate frequencies to be applied by the drive 104, qubits involved in the gate 116, operating frequencies of the qubits 118, type of gate 120, coherence time of the gate 122, noise model 124, and/or other system dynamics 126.

In some embodiments, candidate frequencies to be applied by the drive 104 may comprise a plurality of initial frequency components that may serve as input frequencies to optimal coherence control module 102. For example, candidate frequencies to be applied by the drive 104 may comprise frequency components 106, 108, 110, 112, and 114, in addition to one or more other frequency components within a given frequency range. The range of candidate frequencies may iteratively be chosen according to other inputs to candidate frequencies to be applied by the drive 104, such as qubits involved in the gate 116, type of gate 120, and/or other system dynamics 126. For example, the range of candidate frequencies may be chosen based on information that the qubits involved in the gate are superconducting qubits, according to some embodiments. In some embodiments, candidate frequencies to be applied by the drive 104 may comprise more than one range of frequencies (e.g., frequencies that are non-consecutive with respect to one another but are reproducible by drive 130).

In some embodiments, qubits involved in the gate 116 may provide information about a set of qubits implemented on quantum hardware 136 that are to be coupled together during a given gate, the location of said qubits implemented on quantum hardware 136, and/or information about how said qubits are to be coupled together. For example, in some embodiments, as represented by FIG. 4A, superconducting qubit 402 and superconducting qubit 404 are coupled together via tunable coupler 406 and capacitors 420 and 422. In a second example, in some embodiments, as represented by FIG. 11, qubits involved in the gate 116 may comprise information that superconducting qubit 1102 and superconducting qubit 1104 of quantum waveguide 1100 are to be coupled together during the performance of a given gate. Qubits involved in the gate 116 may additionally comprise information about the type of qubits involved in the gate (e.g., superconducting qubits). Alternatively, such information about the type of qubits may be included in other system dynamics 126.

In some embodiments, operating frequencies of the qubits 118 may comprise information about operating (e.g., resonant) frequencies of the qubits that are to be coupled during a given gate. For example, operating frequencies of the qubits 118 may comprise the operating frequencies of superconducting qubit 402 and superconducting qubit 404 in some embodiments, as described by FIG. 4A. In some embodiments, operating frequencies of the qubits 118 may comprise information about the operating frequencies of the qubits that are to be coupled during a given gate in addition to one or more other qubits that are located on the same quantum hardware but are not involved in the given gate. For example, in some embodiments, as described by quantum waveguide 1100, operating frequencies of the qubits 118 may comprise operating frequencies of other superconducting qubits located on quantum waveguide 1100 in addition to the superconducting qubits of quantum waveguide 1100 that are involved in the given gate (e.g., for a given gate involving superconducting qubit 1102 and superconducting qubit 1104, operating frequencies of the qubits 118 may additionally comprise information about the operating frequencies of superconducting qubit 1106 and superconducting qubit 1108).

In some embodiments, outside of the time allotted for performance of the given gate, it may be advantageous to detune the superconducting qubits from one another such that respective superconducting qubits (e.g., superconducting qubits included in qubits involved in the gate 116) have different respective operating frequencies. It may also be advantageous to detune the frequency of drive 130 from the respective operating frequencies of the respective superconducting qubits that are not involved in the given gate (e.g., superconducting qubits besides the superconducting qubits included in qubits involved in the gate 116). In addition, in some embodiments in which quantum hardware 136 comprises one or more tunable couplers (e.g., tunable coupler 406 in superconducting qubit gate 400), it may be similarly advantageous to detune the frequencies of the one or more tunable couplers from the respective operating frequencies of qubits involved in the gate 116. Such advantageous embodiments may be configured via the input of operating frequencies of the qubits 118 into optimal coherence control module 102, according to some embodiments.

In some embodiments, type of gate 120 may refer to information about the given gate for which pulse profile 134 is generated. Type of gate 120 may comprise information such as the type of Stark shift based gate, cross resonance based gate, adiabatic hybridized gate, or other type of gate that is to be used in a given quantum hardware architecture. Information comprised within type of gate 120 may define said gate to be a single-qubit gate, two-qubit gate, or multi-qubit gate. In some embodiments, type of gate 120 may include information describing a logical operation performed by the gate, such as a CNOT gate, iSWAP gate, a B-gate, a controlled-Z (CZ) gate, etc., which may additionally be used to determine the type of transformation to a given piece of logical information stored in one or more of the superconducting qubits that is to take place during the performance of the gate between said superconducting qubits.

In some embodiments, pulse profile 134 may be changed, adjusted, and/or modified based on the information provided in type of gate 120. In some embodiments in which pulse profile 134 is gate-specific, classical computing device(s) 100 may generate a new pulse profile or adjust a current version of pulse profile 134 in order to induce spin locking for the given gate-specific and/or qubit-specific architecture(s).

In some embodiments, coherence time of the gate 122 may refer to information about the coherence time required to complete the given gate. In some embodiments, it may be advantageous to design pulse profile 134 based at least in part on a known or expected coherence time of the given superconducting qubits involved in the gate in order to reduce the probability of a fault or error on said gate. In some embodiments, classical computing device(s) 100 may receive qubits involved in the gate 116 and/or type of gate 120 as an input to optimal coherence control module 102 and may apply this information to determine coherence time of the gate 122. In some embodiments in which the coherence time of a commonly-used gate for a given quantum hardware architecture is known, and/or a similar type of gate has been performed before between similar types of superconducting qubits wherein classical computing device(s) 100 may determine the expected coherence time of the given gate, optimal coherence control module 102 may determine or receive such information as an input pertaining to coherence time of the gate 122. In some embodiments, a simulation of the given gate and/or of the given quantum hardware may be made, and a simulated coherence time of the superconducting qubits during performance of the gate may be determined via the simulation. Classical computing device(s) 100 may be configured to perform said simulation of the gate and/or may be configured to receive the simulation. In such embodiments, the simulated coherence time of the gate determined from the simulation may be determined and/or applied as input in coherence time of the gate 122.

In some embodiments, noise model 124 may refer to information about the expected, simulated, or experimentally-measured noise for quantum hardware 136. In some embodiments, noise model 124 may be received by classical computing device(s) 100 and used as input to optimal coherence control module 102. In some embodiments, one or more classical computing devices of classical computing device(s) 100 may be configured to simulate the expected noise within quantum hardware 136, and noise model 124 may therefore be determined. Noise model 124 may comprise information about noise specific to the given gate, and/or information about noise across quantum hardware 136, according to some embodiments.

In some embodiments, other system dynamics 126 may also serve as input(s) to optimal coherence control module 102. Other system dynamics 126 may refer to relevant information pertaining to the architecture of the given quantum hardware, gates, and/or quantum circuit that may be used to determine one or more characteristics of a pulse profile to be applied by the drive 128, according to some embodiments.

Figure 1B:
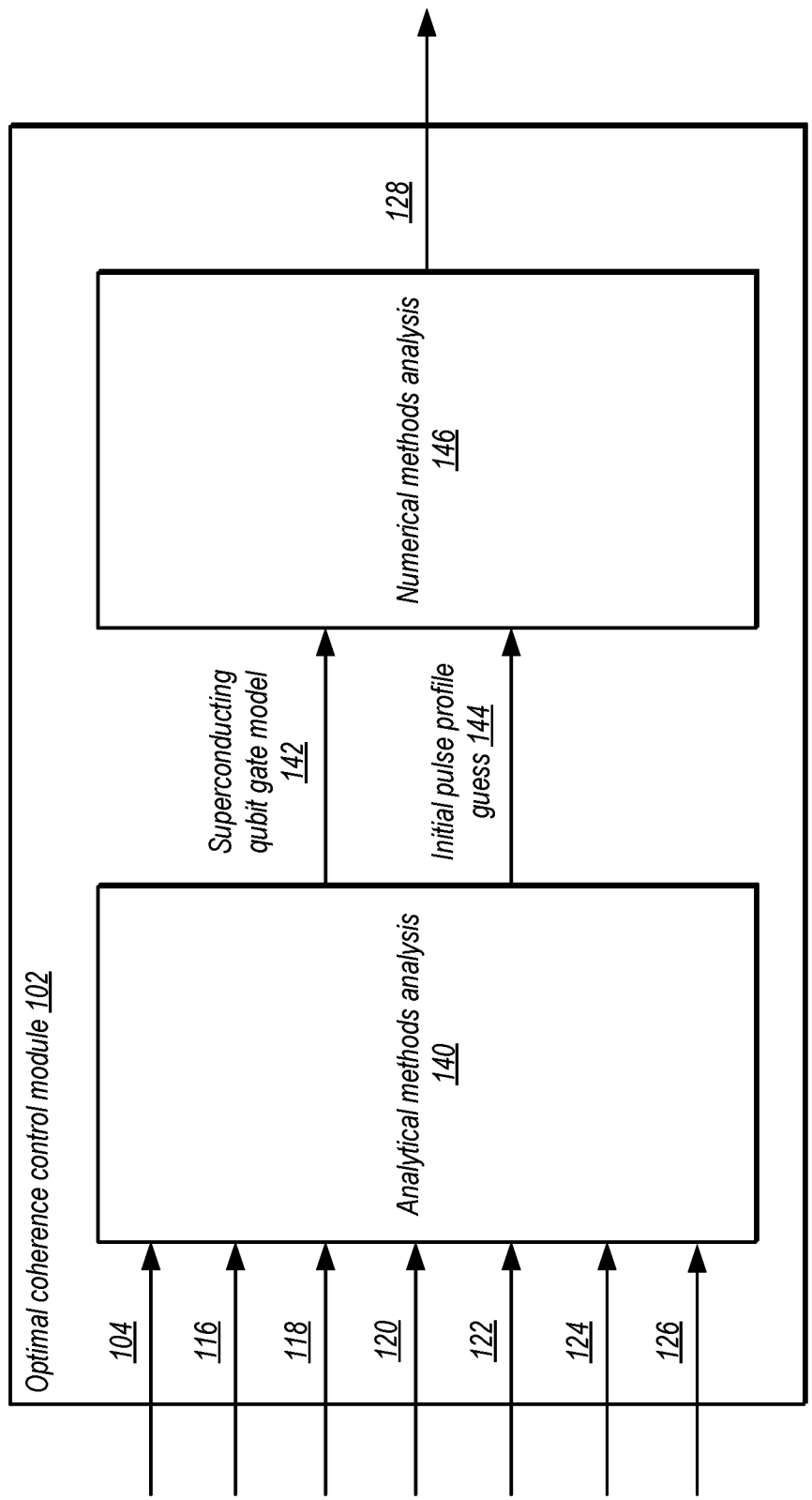
FIG. 1B illustrates an example optical coherence control module subsystem of the system illustrated in FIG. 1A, wherein the subsystem performs analytical and numerical analyses in order to determine the pulses for the drive, according to some embodiments.

FIG. 1B illustrates an example optical coherence control module subsystem of the system illustrated in FIG. 1A, wherein the subsystem performs analytical and numerical analyses in order to determine the pulses for the drive, according to some embodiments.

In some embodiments, inputs 104, 116, 118, 120, 122, 124, and/or 126 may be determined and/or received by classical computing device(s) 100 for use by optimal coherence control module 102. For example, in such example embodiments shown by a pulse profile to be applied by the drive 128 in FIG. 1A, optimal coherence control module 102 determined, based at least in part on a combination of inputs 104, 116, 118, 120, 122, 124, and 126, that frequency components 106 and 110 should be excluded from the pulse profile. Classical computing device(s) 100 may then be further configured to provide control instructions to drive 130 such that pulses 132 having pulse profile 134, which comprises at least frequency components 108, 112, and 114, may be applied by drive 130 onto quantum hardware 136 during performance of a given gate, according to some embodiments.

Optimal coherence control module 102 may refer to various analytical and/or numerical methods (e.g., optimal coherence control methods) as described herein, which may be used to determine a pulse profile for a spin locking drive and may be executed as program instructions on classical computing device(s) 100. The program instructions may be further configured to provide the results determined by optimal coherence control module 102 to drive 130. As shown FIG. 1B, optimal coherence control module 102 may include two submodules: analytical methods analysis 140 and numerical methods analysis 146. In some embodiments, a combination of inputs 104, 116, 118, 120, 122, 124, and 126 may be used to generate an initial estimation, or guess, of a pulse profile to be used by a spin locking drive via analytical methods analysis 140. The combination of inputs 104, 116, 118, 120, 122, 124, and 126 may be used to generate a Hamiltonian representation of the performance of the gate (e.g., superconducting qubit gate model 142). This Hamiltonian representation may include representations of properties of the superconducting qubits involved in the gate, properties of additional quantum hardware components such as tunable coupler(s) that are involved in the gate, the expected coupling between the superconducting qubits during performance of the gate, and properties of the pulses that induce spin locking during performance of the gate. For example, superconducting qubit gate model 142 may resemble an equation set for a given superconducting qubit gate, such as $\mathcal{H}_{lab}$ for superconducting qubit gate 400, described herein with regard to FIG. 4A.

Analytical methods analysis 140 may additionally be used to generate initial pulse profile guess 144, according to some embodiments. Given the overall Hamiltonian representation of the performance of the gate (e.g., superconducting qubit gate model 142), initial pulse profile guess 144 may be generated as means of providing an initial estimation of final frequency components that may be included in pulse profile to be applied by the drive 128, based on the model generated by superconducting qubit gate model 142. As described in the following paragraphs, initial pulse profile guess 144 may provide a starting point for numerical methods analysis 146 to be used towards convergence of a more optimized form of initial pulse profile guess 144, ultimately resulting in pulse profile to be applied by the drive 128. Continuing with the example of superconducting qubit gate 400 shown in FIG. 4A, initial pulse profile guess 144 may resemble $\mathcal{H}_I^{eff}$ for superconducting qubit gate 400 (see the description for FIG. 4A below for additional description about superconducting qubit gate 400). In some embodiments, superconducting qubit gate model 142 and initial pulse profile guess 144 may be referred to herein as an equation set for the superconducting qubit gate.

Numerical methods analysis 146 may include an iterative process, according to some embodiments. In such embodiments, initial pulse profile guess 144 may serve as a starting point for refining the frequency components of the pulse profile, and numerical methods analysis 146 may then iterate on initial pulse profile guess 144 such that it is refined and/or improved through numerical methods such as optimal coherence control methods. After one or more iterations on initial pulse profile guess 144, numerical methods analysis 146 may provide pulse profile to be applied by the drive 128. As described above with regard to FIG. 1A, pulse profile to the applied by the drive 128 may then be provided to drive 130, via classical computing device(s) 100, as part of control instructions to the drive.

Alternatively, superconducting qubit gate model 142 and/or initial pulse profile guess 144 may be received as part of other system dynamics 126, according to some embodiments. In such embodiments, optimal coherence control module 102 may not include analytical methods analysis 140, or may skip analytical methods analysis 140, and may provide superconducting qubit gate model 142 and initial pulse profile guess 144 from other system dynamics 126 directly to numerical methods analysis 146.

FIG. 2 is a flowchart illustrating a process of determining pulses having a pulse profile that induce spin locking during performance of a gate between superconducting qubits implemented on quantum hardware, according to some embodiments.

In block 200, pulses having a pulse profile (e.g., pulses 132 having pulse profile 134) that are to be applied during performance of a gate such that spin locking is induced is determined. In some embodiments, the quantum hardware may resemble quantum hardware 136, and may comprise superconducting qubits. A set of those superconducting qubits may be involved in a given gate, such as superconducting qubit gate 400, and therefore the pulses may be directed at the set of superconducting qubits involved in the given gate via one or more drives, such as drives 408 and 410. In some embodiments, the pulses may comprise frequency components, such as frequency components shown in a pulse profile to be applied by the drive 128.

Blocks 202 and 204 describe process steps within the process of determining a pulse profile to be applied via pulses by a drive in block 200. In block 202, a subset of frequency components producible by the drive are determined to cause leakage outside of respective code spaces (see the description for FIG. 4B described herein) of the set of superconducting qubits via optimal coherence control methods. Block 202 may resemble methods described in FIGS. 1A and 1B, according to some embodiments. For example, candidate frequencies to be applied by the drive 104 comprises frequency components 106, 108, 110, 112, and 114. Through optimal coherence control module 102, it may be determined that a subset of the frequency components, such as frequency components 106 and 110, cause leakage outside of respective code spaces of the set of superconducting qubits. The optimal coherence control methods of block 202 may resemble some embodiments shown in FIG. 1B, wherein optimal coherence control module 102 applies analytical and numerical methods (e.g., analytical methods analysis 140 and numerical methods analysis 146) to determine the subset of the frequency components. In block 204, the frequency components (e.g., frequency components 106 and 110 in this example) are then excluded from the pulse profile, as shown in a pulse profile to be applied by the drive 128. Pulses 132 having pulse profile 134 may then comprise at least frequency components 108, 112, and 114, but not frequency components 106 or 108, according to some embodiments.

Block 204 may describe embodiments in which the optimal coherence control methods of block 202 return results detailing the subset of frequency components that cause leakage outside of respective code spaces, and the subset is then excluded before the pulses are applied by drive. Block 204 may additionally describe embodiments in which optimal coherence control methods of block 202 perform the processes described in blocks 202 and 204 in conjunction with one another or as one integrated step. In such embodiments, one or more classical computing devices (e.g., classical computing device(s) 100) determine, via optimal coherence control methods, a subset of frequency components that cause leakage outside of respective code spaces, and return frequencies other than the subset that causes leakage (e.g., the filtered frequency components of the pulse profile to be applied by the drive as shown in a pulse profile to be applied by the drive 128). In other embodiments, the optimal coherence control methods of block 202 may comprise one or more steps, such as those of an iterative process. In such iterative embodiments, the optimal coherence control methods may receive one or more initial inputs such as those shown in FIGS. 1A and 1B, then the optimal coherence control methods may exclude, remove, and/or filter one or more frequency components based at least in part on the initial inputs received. The optimal coherence control methods may then be further configured to receive one or more additional inputs (e.g., additional system dynamics inputs to optimal coherence control module 102 as shown in FIG. 1A) in addition to the one or more initial inputs, and exclude one or more additional frequency components based at least in part on the additional received inputs. Management of such an iterative process may be managed by classical computing device(s) 100, according to some embodiments.

In block 206, the gate is performed and, during the performance of the gate, the plurality of pulses having the determined pulse profile (e.g., determined via blocks 200, 202, and 204) are applied to induce spin locking for the duration of the gate. In some embodiments, block 206 may resemble drive 130 emitting a plurality of pulses having the determined pulse profile 134 onto quantum hardware 136 during performance of a given gate.

Figure 3:
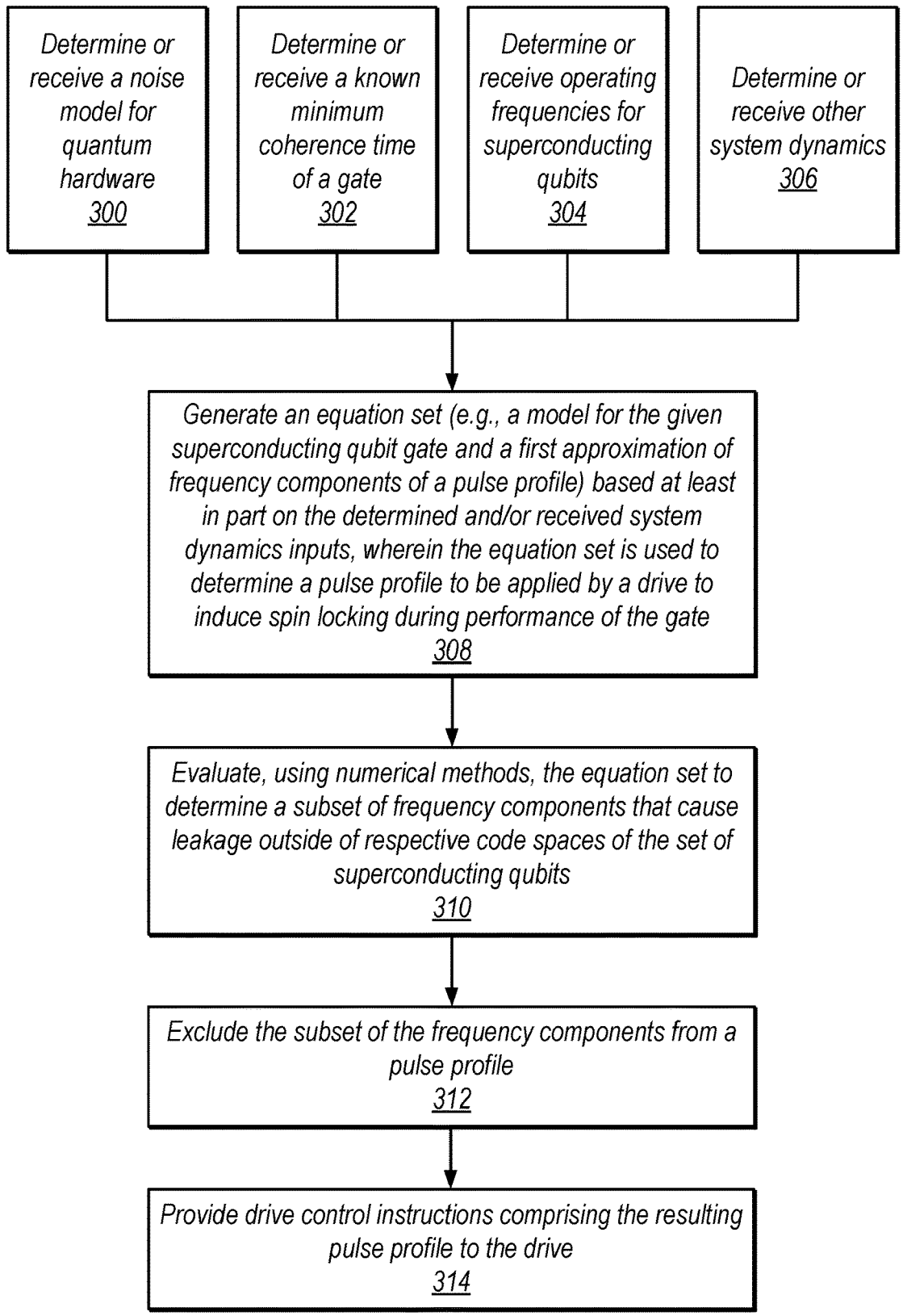
FIG. 3 is a flowchart illustrating a process of receiving and determining inputs pertaining to the system dynamics of quantum hardware which may be used to determine pulses having a pulse profile for a drive that induce spin locking during performance of a given gate between superconducting qubits implemented on the quantum hardware, according to some embodiments.

FIG. 3 is a flowchart illustrating a process of receiving and determining inputs pertaining to the system dynamics of quantum hardware which may be used to determine pulses having a pulse profile for a drive that induce spin locking during performance of a given gate between superconducting qubits implemented on the quantum hardware, according to some embodiments.

In block 300, a noise model for quantum hardware may be determined or received. In such embodiments, the noise model in block 300 may resemble noise model 124 and the functionalities described herein for noise model 124. The quantum hardware in block 300 may resemble quantum hardware 136 and may comprise superconducting qubits, according to some embodiments. The quantum hardware in block 300 may additionally be configured to allow one or more gates between the superconducting qubits of the quantum hardware to be performed. Example embodiments of such gates between superconducting qubits are shown and discussed for FIGS. 4A, 11, and 12 herein.

In block 302, a known minimum coherence time of a gate may be determined or received. The known minimum coherence time of the gate may resemble coherence time of the gate 122 and the functionalities described herein for coherence time of the gate 122. The coherence time of the gate may refer to the coherence time of the components (e.g., the superconducting qubits, tunable coupler(s), etc.) involved in the gate, according to some embodiments. In some embodiments, a simulation pertaining to the quantum hardware described in block 300 may be performed, and, from the simulation, the expected coherence time of the gate may be determined. The coherence time of the gate in block 302 may additionally be referred to as "minimum" coherence time of the gate in order to describe the minimum duration of the gate which allows for the functionality of the given gate to be performed without high risk of an error or fault resulting from decoherence during said gate performance.

In block 304, operating frequencies of the superconducting qubits of the quantum hardware described in block 300 may be determined or received. The operating frequencies of the superconducting qubits may resemble operating frequencies of the qubits 118 and the functionalities described herein for operating frequencies of the qubits 118.

In block 306, other system dynamics may be determined or received. The other system dynamics may resemble other system dynamics 126 and the functionalities described herein for other system dynamics 126. Block 306 may encompass quantum hardware design information, information about the logical information that is being encoded, utilized, and/or calculated by the quantum hardware, and/or other information that may be relevant to the optimal coherence control method equation set in block 308. In some embodiments, block 306 may additionally refer to an estimation of some frequency components that may be used by a spin locking drive (e.g., initial pulse profile guess 144).

In some embodiments, blocks 300, 302, 304, and 306 may be determined by one or more classical computing devices, such as classical computing device(s) 100, and/or may be received as input to block 308. In some embodiments, blocks 300, 302, 304, and 306 may serve as inputs to block 308, and block 308 may receive input from blocks 300, 302, 304, and 306 simultaneously, iteratively, and/or consecutively. In addition, a person having ordinary skill in the art should understand that blocks 300, 302, 304, and 306 are meant to be example inputs to block 308. Additional inputs, such as those discussed in FIG. 1A as input to optimal coherence control module 102 (e.g., other system dynamics 126) may also be represented by blocks 300, 302, 304, and 306.

In block 308, an equation set is generated based at least in part on input from blocks 300, 302, 304, and 306. In some embodiments, the equation set generated in block 308 may be used to determine a pulse profile to be applied by a drive to induce spin locking during performance of a given gate. The equation set may also be referred to as control equations, in reference to one or more characteristics of the system (e.g., components of the gate) that are being optimized via said equation set, according to some embodiments. In some embodiments, the equation set may be generated via optimal coherence control module 102. In other embodiments, the equation set may be generated in classical computing device(s) 100 and then received by optimal coherence control module 102. In some embodiments, the equation set is used, at least in part, to determine a pulse profile (e.g., pulse profile to be applied by the drive 128) to be applied via pulses by a drive (e.g., drive 130) to induce spin locking during performance of the gate described in block 302.

In block 310, the equation set may be evaluated using analytical methods, numerical methods and/or one or more other convergence techniques. In some embodiments, evaluation of the equation set may result in the determination of a subset of frequency components that cause leakage outside of respective code spaces of the set of superconducting qubits. In other embodiments, evaluation of the equation set may determine a pulse profile comprising frequency components which exclude frequency components that cause leakage outside of respective code spaces of the set of superconducting qubits.

In some embodiments, the equation set may be evaluated via optimal coherence control module 102 on one or more classical computing device(s) 100. Furthermore, block 310 may resemble block 202 and the description herein for block 202, according to some embodiments. In block 312, the subset of the frequency components may be excluded from the pulse profile. In some embodiments, block 312 may resemble block 204 and the description herein for block 204, according to some embodiments.

In block 314, drive control instructions comprising the resulting pulse profile (e.g., the pulse profile resulting from blocks 300, 302, 304, 306, 308, and 310) may be provided to the drive for applying a plurality of pulses during performance of the given gate(s) described by block 302. In some embodiments, the drive control instructions may be provided by one or more classical computing devices, such as classical computing device(s) 100, to drive 130. The drive control instructions may comprise information such as the duration of the pulses, characteristics of the pulse profile (e.g., information pertaining to the frequency components, amplitudes, shaping of the pulse envelope, etc.), and/or information pertaining to the electronics of the drive (e.g., information specific to one or more functionalities of the drive due to the type of source that the drive may be). In some embodiments, at least part of the drive control instructions of block 314 may resemble a pulse profile to be applied by the drive 128 and the functionalities described herein for a pulse profile to be applied by the drive 128.

In some embodiments, the methods described in FIGS. 2 and 3 may be used in combination with one another.

Various different systems, implementations, and methods may implement the techniques discussed above. For example, FIG. 13, discussed below, provides an example classical computing device that may implement various ones of the techniques discussed herein. FIGS. 4A-4B, 5A-5C, 6A-6C, 7A-7C, 8A-8C, 9A-9C, 10A-10C, 11, and 12 also discussed below, represent implementations that may be illustrated using methods and techniques of FIGS. 2 and 3, and performed using the system illustrated in FIGS. 1A and 1B.

FIG. 4A illustrates an example of a two-qubit gate which is driven by a spin-locking drive, and FIG. 4B illustrates an example of a code space mapping for a superconducting qubit, according to some embodiments.

In some embodiments, superconducting qubit gate 400 comprises superconducting qubit 402 and superconducting qubit 404, wherein superconducting qubits 402 and 404 are capacitively coupled to tunable coupler 406 (e.g., a harmonic oscillator) via capacitance 420 and capacitance 422. In addition, superconducting qubit 402, superconducting qubit 404, and tunable coupler 406 are connected to ground 432. In some embodiments, tunable coupler 406 may be used to capacitively couple superconducting qubit 402 and superconducting qubit 404 during performance of superconducting qubit gate 400. In some embodiments, tunable coupler 406 may resemble a quantum harmonic oscillator or a resonator. Capacitance 420 and capacitance 422 may respectively have capacitances of $C_g$, and may represent a given coupling strength of g between superconducting qubit 402 and superconducting qubit 404. Coupling strength may additionally be referred to as a coupling coefficient, according to some embodiments.

In the embodiments shown in FIG. 4A, superconducting qubit gate 400 may be driven by drive 408 and drive 410, wherein drive 408 may be configured to emit pulses 412 having pulse profile 414, directed at superconducting qubit 402, and drive 410 may be configured to emit pulses 416 having pulse profile 418, directed at superconducting qubit 404. In some embodiments, pulses 412 and pulses 416 may be emitted by a single drive (e.g., drive 408 or drive 410).

In some embodiments, superconducting qubits 402 and 404 are characterized by Josephson circuits comprising Josephson subcircuits 424 and 426, respectively, wherein Josephson subcircuits are each shunted by capacitance 428 and capacitance 430, respectively. In some embodiments shown in FIG. 4A of superconducting qubit 402 and superconducting qubit 404, the superconducting qubits may represent transmons, however other embodiments which comprise other superconducting qubit architectures may similarly be applied.

In the embodiments shown in FIG. 4A, superconducting qubit 402 may have an operating (e.g., resonant) frequency of $\tilde{\omega}_1$ and superconducting qubit 404 may have an operating frequency of $\tilde{\omega}_2$. These may refer to different operating frequencies with respect to one another. In some embodiments, information that superconducting qubits 402 and 404 have respective operating frequencies $\omega_1$ and $\omega_2$ may be used in operating frequencies of the qubits 118 as input to optimal coherence control module 102. In such embodiments, the known operating frequencies of superconducting qubits 402 and 404 may be used at least in part to configure characteristics of pulse profiles 412 and 414, according to some embodiments.

In some embodiments, the implementations shown for superconducting qubit gate 400 may be used to map respective code spaces of superconducting qubits 402 and 404, such as code space mapping for superconducting qubit q 450 shown in FIG. 4B. Code space mapping for superconducting qubit q 450 may refer to a code space mapping for a two-level system, according to some embodiments. As shown in FIG. 4B, the two-level system may be encoded via a given superconducting qubit q, which may, in turn, comprise n available energy state levels that may be potentially mapped to a given code space. In the embodiments shown in FIG. 4B, the ground state and the first excited state of superconducting qubit q are chosen and used to map the given code space. These states may be referred to as levels 452 and 454, respectively.

In such embodiments, $\omega_q$ may refer to the transition frequency from the ground state (e.g., level 452) to the first excited state (e.g., level 454) of superconducting qubit q. However, due at least in part to noise, the energy of level 454 may be represented by $\omega_q+\delta$, wherein $\delta$ represents a given energy shift as described above. This may also be referred to as superconducting qubit q having a "noisy" energy gap, according to some embodiments. In some embodiments in which the two-level system represented by code space mapping for superconducting qubit q 450 is driven by a drive, such as drive 408 or drive 410, the frequency of said drive may be defined as $\Omega$. As the duration of the given gate in superconducting qubit gate 400 may occur over a given time T (as shown in FIGS. 5A-10C), level 454 may be described by $\omega_q+\delta(t)$, and the drive by $\Omega \cos(\omega t)$, according to some embodiments. Levels 452 and 454 may be chosen from n available energy state levels of the given superconducting qubit q. One or more of the available energy state levels that do not comprise levels 452 and 454 may be referred to as additional excited states of superconducting qubit q, and may contribute to leakage outside of code space mapping for superconducting qubit q 450 if populated during performance of superconducting qubit gate 400, according to some embodiments.

When code space mapping for superconducting qubit q 450 is moved to the rotating frame (see the following paragraphs of description herein), the term $\delta\sigma_z$ may act as an effective drive on the dressed states 456 and 460 (e.g., eigenstates in the rotating frame), wherein level 458 represents the energy shift $\delta$.

In some embodiments, the configurations shown by superconducting qubit gate 400, wherein superconducting qubits 402 and 404 are transmons, may be represented by the following set of equations:

$$\mathcal{H}_{lab} = \mathcal{H}_{tunable\ coupler} + \sum_{j=1}^{2} \mathcal{H}_{transmon}^j + \mathcal{H}_{drive}^j + \mathcal{H}_{coupling}^j$$

$$\mathcal{H}_{transmon}^j = \omega_j q_j^\dagger q_j + \frac{\alpha_j}{2}(q_j^\dagger)^2 q_j^2 - \frac{\alpha_j^2}{4\omega_j}(q_j^\dagger)^3 q_j^3$$

$$\mathcal{H}_{drive}^j = -\Omega_j \sin(\omega_d^j t - \phi_j)(iq_j^\dagger + h.c.) \xrightarrow{RWA} \frac{1}{2}\Omega_j q_j^\dagger e^{-i(\omega_d^j t - \phi_j)} + h.c.;$$

$$\Omega_j \ll \omega_d^j$$

$$\mathcal{H}_{tunable\ coupler} = vr^\dagger r$$

$$\mathcal{H}_{coupling}^j = g(iq_j^\dagger + h.c.)(ir^\dagger + h.c.) \xrightarrow{RWA} g(q_j^\dagger r + h.c.); g \ll v, \omega$$

wherein $q_j$ and r are the annihilation operators for the jth transmon (e.g., superconducting qubits 402 and 404) and the tunable coupler (e.g., tunable coupler 406), respectively, $\omega_j$ is the transition frequency from the ground to the first excited transmon state (e.g., level 452 to level 454), $\omega_j-\alpha_j$ is the transition frequency from the first to the second excited transmon state, $\Omega_j$ is the drive Rabi amplitude, $\omega_d^j$ is the drive frequency (e.g., drives 408 and 410), v is the frequency of the tunable coupler, and g is the coupling between superconducting qubits 402 and 404 and tunable coupler 406 (e.g., capacitances 420 and 422).

Moving to the interaction picture with respect to the drive frequency $\omega_d^j q_j^\dagger q_j$ and the tunable coupler frequency $vr^\dagger r$, the Hamiltonian may be given by:

$$\mathcal{H}_I = \delta_j q_j^\dagger q_j + \frac{\alpha_j}{2}(q_j^\dagger)^2 q_j^2 + \frac{1}{2}\Omega_j(q_j^\dagger e^{i\phi_j} + h.c.) + g(q_j^\dagger r e^{i\Delta_j t} + h.c.)$$

wherein $\delta_j$ is the drive detuning from the superconducting qubits (e.g., $\delta_j=\omega_j-\omega_d^j$), and $\Delta_j$ is the detuning of the superconducting qubits from the tunable coupler (e.g., $\Delta_j=\omega_j-v$).

In some embodiments, the system may be simplified using the qubit approximation and the rotating wave approximation (RWA). The Hamiltonian may then be given by $$\mathcal{H} = \frac{\omega_j - \omega_d^j}{2}\sigma_z^j + \frac{1}{2}\Omega_j(\sigma_+^j e^{i\phi_j} + h.c.) + g(\sigma_+^j r e^{i(\omega_j-v)\tau} + h.c.).$$

In some embodiments, in order to induce spin locking, the drive is taken to be on-resonance with the transmons $\omega_j=\omega_d^j$ in the above equation, and $\Omega_j$ may be identified as the energy gaps of the transmons. In some embodiments, the tunable coupler may be adiabatically eliminated in the following manner by obtaining an effective Hamiltonian for the transmons in the dispersive regime ($g \ll \omega_j-v\pm\Omega_j$). Rotating the drive to the $\sigma_x$ basis (e.g., $$a\frac{1}{2}\phi_j\sigma_z$$

rotation) and moving to a second interaction picture with respect to the new energy gaps (e.g., $$\frac{1}{2}\Omega\sigma_x$$

the Hamiltonian may then be described as:

$$\mathcal{H}_I = \frac{g}{2}(\sigma_x^j + i(iS_+^j e^{i\Omega_j t} + h.c.))re^{i(\omega_j-v)t-i\phi_j} + h.c.$$

wherein $S_+=(\sigma_z-i\sigma_y)/2$ is the raising operator for the $\sigma x$ basis. Assuming an equal detuning of the superconducting qubits from the tunable coupler (e.g., $\omega_j-v=\Delta$), and equal drive amplitudes (e.g., $\Omega_j=\Omega$), the effective Hamiltonian may be written as:

$$\mathcal{H}_I^{\text{eff}} \approx \frac{1}{4} \frac{g^2}{\omega - \nu}$$

$$\left( \sigma_x^1 \sigma_x^2 + \frac{1}{1 - \left(\frac{\Omega}{\omega - \nu}\right)^2} \frac{\sigma_z^1 \sigma_z^2 + \sigma_y^1 \sigma_y^2}{2} + \frac{\frac{\Omega}{\omega - \nu}}{1 - \left(\frac{\Omega}{\omega - \nu}\right)^2} \frac{i(\sigma_y^1 \sigma_z^2 - \sigma_z^1 \sigma_y^2)}{2} \right)$$

$$e^{i(\phi_2 - \phi_1)} + h.c.$$

wherein the rotating terms may be neglected (e.g., the RWA for $\Omega \gg g^2/(\omega-\nu)$). The transition from $\mathcal{H}_I$ to $\mathcal{H}_I^{\text{eff}}$ shown above may be completed via an effective Hamiltonian formalism:

$$\mathcal{H}_{\text{eff}} = \sum_{n=m} [h_n^\dagger, h_n] + \sum_{n<m} \frac{1}{2} \left( \frac{1}{\omega_n} + \frac{1}{\omega_m} \right) ([h_m^\dagger, h_n] e^{i(\omega_m - \omega_n)t} + h.c.);$$

$$|h_n|, |\omega_n - \omega_m| \ll \omega_n.$$

In some embodiments, for equal drive phases $\phi_j = \phi$, the $\sigma_z \sigma_y$ terms may be zero, and such dynamics result in an iSWAP gate for gate time $T = 0.5 \ (\omega - \nu)/g^2$ in which coherence times of the transmons have been prolonged via the configurations of the control field described above.

Such embodiments as described above may be advantageous since the mitigation of noise via spin locking may be integrated into the gate mechanism through the gate protocol described above. In order to further avoid population of higher energy states of the transmons, it may also be advantageous to generate the pulses having pulse profiles via optimal coherence control methods.

In some embodiments, a noise model for superconducting qubit gate 400 may be defined as $$\mathcal{H}_{\text{noise}} = (X_t^j + Y_t^j) q_j^\dagger q_j,$$

wherein $X_t^j$ is an Ornstein-Uhlenbeck process and $Y_t^j$ is a jump (e.g., transition) process for the jth transmon. In some embodiments, $\mathcal{H}_{\text{noise}}$ may be used as part of noise model 124 as input to optimal coherence control module 102.

Figure 5C:
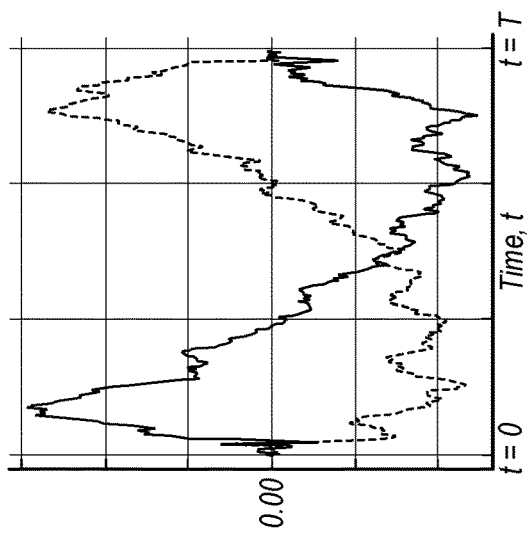
FIGS. 5A-5C illustrate an example of pulses during performance of a given gate between superconducting qubits, according to some embodiments.
Figure 5B:
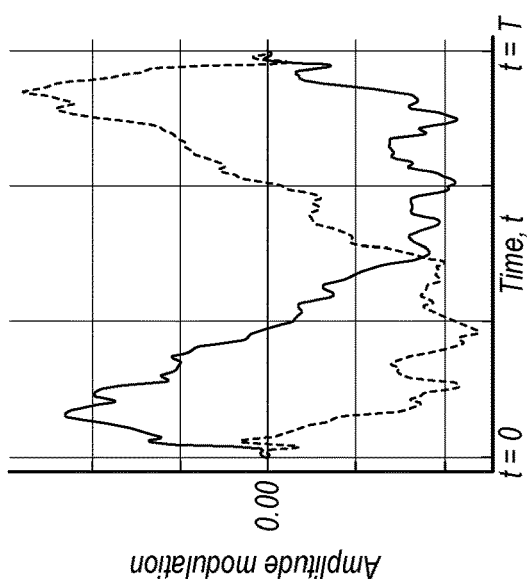
Figure 5A:
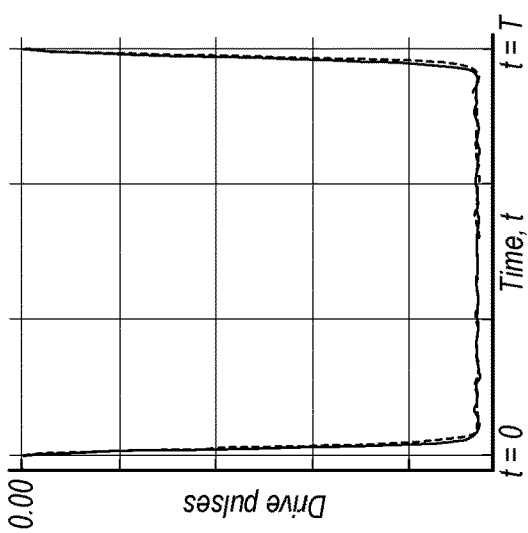

FIGS. 5A-5C illustrate an example of pulses during performance of a given gate between superconducting qubits, according to some embodiments.

In some embodiments in which quantum hardware 136 comprises a two-qubit gate and the qubits are coupled together via a tunable coupler, such as superconducting qubit gate 400, pulses 132 having pulse profile 134 may resemble the frequency components shown in FIGS. 5A-5C. For such example embodiments as shown in FIGS. 5A-5C, inputs to optimal coherence control module 102 that may result in such pulses as those shown in FIGS. 5A-5C may comprise qubits involved in the gate 116 (e.g., 2 superconducting qubits), operating frequencies of the qubits 118 (e.g., $\omega_j$, wherein j=1 for superconducting qubit 1 and j=2 for superconducting qubit 2), type of gate 120 (e.g., iSWAP), and coherence time of the gate 122 (e.g., duration of the gate 500).

Given that the operating frequencies of the two superconducting qubits are $\omega_1$ and $\omega_2$ in this example, pulse profile to be applied by the drive 128 may comprise frequencies that are different from $\omega_1$ and $\omega_2$ (e.g., frequency components 108, 110, 112, and 114 may be accepted by optimal coherence control module 102 but frequency components 106 and 108 may be excluded if found to be close to the operating frequencies of superconducting qubits 1 and/or 2). Remaining frequency components in pulse profile to be applied by the drive 128 may resemble the X, Y, and Z frequency components shown in FIGS. 5A-5C, according to some embodiments. A person having ordinary skill in the art should understand that the X, Y, and Z frequency components have been broken up into FIGS. 5A, 5B, and 5C for ease of description herein, and that the frequency components of FIGS. 5A, 5B, and 5C together (1) bring the superconducting qubits involved in the gate to close to resonance with the tunable coupler (e.g., tunable coupler 406 in some embodiments such as those shown in FIG. 4A, and/or with harmonic oscillators of quantum metamaterial 1124 in quantum waveguide 1100 described below) and (2) induce spin locking during the given iSWAP gate. In some embodiments, frequency components of the pulses of the drive discussed in FIGS. 5A, 5B, and 5C may act as a single microwave field (comprised of at least the frequency components shown in FIGS. 5A-5C) during performance of the gate.

In some embodiments, the frequency components shown in FIG. 5A (e.g., Z frequency components for superconducting qubits 1 and 2) may represent frequency components that bring the two superconducting qubits into resonance with one another (via the tunable coupler) for the duration of the gate. As shown in FIG. 5A, Z frequency components may undergo changes in frequency between the start of the performance of the gate (e.g., t=0) and the end of the performance of the gate (e.g., t=T) in order to achieve this on-resonance. For example, such Z frequency components of the drive may drive superconducting qubits 1 and 2 from their operating frequencies prior to the start of the performance of the gate (e.g., $\omega_1$ and $\omega_2$) to a new frequency in order for superconducting qubits 1 and 2 to be on-resonance with one another for the duration of the gate. FIGS. 5B and 5C, on the other hand, may represent amplitude modulations of the spin locking drive that induce spin locking in order to bring superconducting qubits 1 and 2 into resonance with one another for the duration of the gate. For example, the Y and X frequency components of the given spin locking drive for superconducting qubit 1 (shown in FIG. 7B) may be represented by the following:

$$Y_1(t) \cos(\omega_1 t) + X_1(t) \sin(\omega_1 t),$$

wherein $Y_1(t)$ and $X_1(t)$ may represent the amplitude modulations of the Y and X frequency components directed at superconducting qubit 1 to induce spin locking. A similar equation (e.g., $Y_2(t) \cos(\omega_2 t) + X_2(t) \sin(\omega_2 t)$) may be used for $Y_2(t)$ and $X_2(t)$ amplitude modulations of the Y and X frequency components directed at superconducting qubit 2 (shown in FIG. 7C). In some embodiments, the X and Y amplitude modulation components shown in FIGS. 5B and 5C may start at zero at t=0 and end at zero at t=T. This feature of the pulses for the given iSWAP gate represented by FIGS. 5A-5C may ensure that the energy levels of the tunable coupler involved in the gate (e.g., tunable coupler 406) is not populated at t=T (e.g., wherein T=duration of the gate 500, as shown in FIGS. 5A-5C).

Figure 6C:
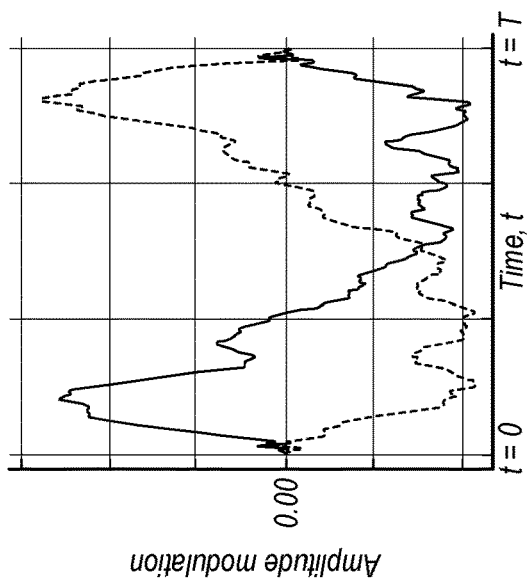
FIGS. 6A-6C illustrate a second example of pulses during performance of a given gate between superconducting qubits, according to some embodiments.
Figure 6B:
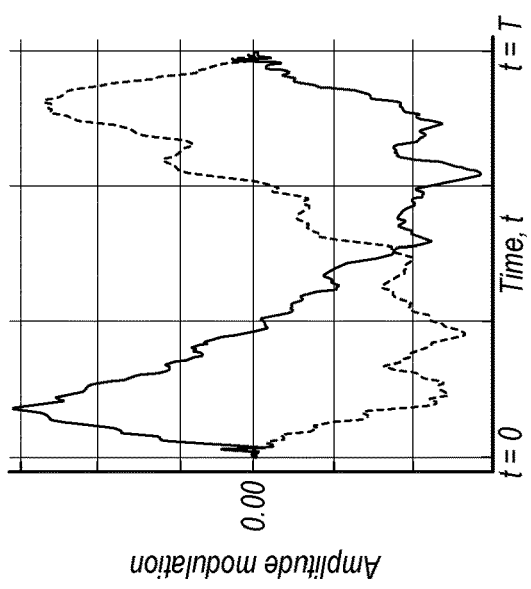
Figure 6A:
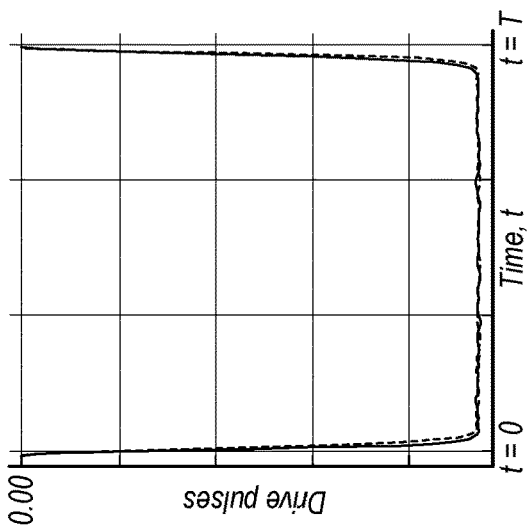

FIGS. 6A-6C illustrate a second example of pulses during performance of a given gate between superconducting qubits, according to some embodiments.

In some embodiments in which type of gate 120 is not an iSWAP gate (e.g., FIGS. 5A-5C) but a B-gate, wherein the B-gate is a two-qubit gate and the superconducting qubits are coupled together via a tunable coupler, pulses for a given pulse profile may resemble the frequency components shown in FIGS. 6A-6C. Similarly to FIGS. 5A-5C, Z frequency components shown in FIG. 6A for superconducting qubits 1 and 2 of the B-gate may represent frequency components of the drive that bring the two superconducting qubits into resonance with one another (via the tunable coupler) for the duration of the B-gate, according to some embodiments. In addition, FIGS. 6B and 6C may represent amplitude modulations of additional Y and X frequency components of the spin locking drive that induce spin locking once superconducting qubits 1 and 2 are on-resonance with one another during performance of the B-gate. In some embodiments, the duration of the gate 600 may be a shorter, a longer, or the same amount of time as duration of the gate 500.

Figure 7C:
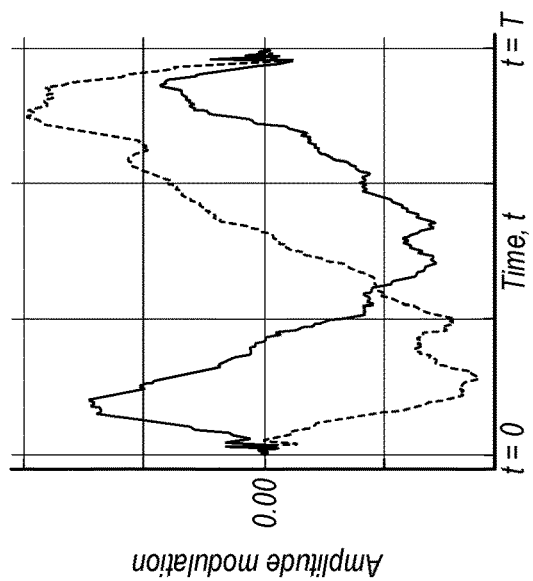
FIGS. 7A-7C illustrate a third example of pulses during performance of a given gate between superconducting qubits, according to some embodiments.
Figure 7B:
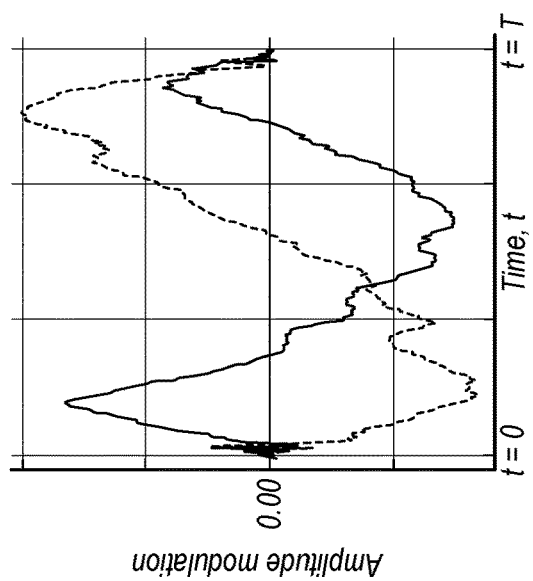
Figure 7A:
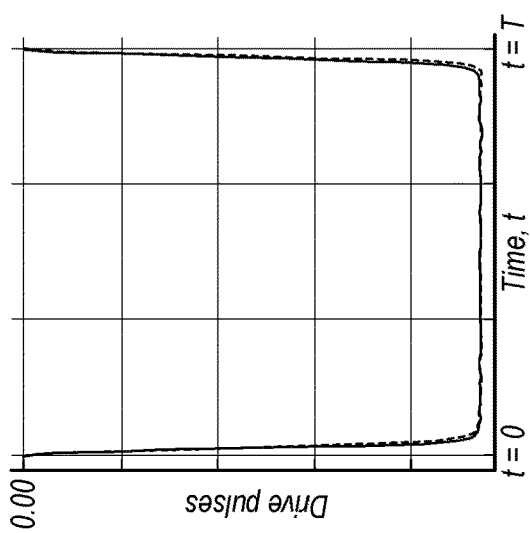

FIGS. 7A-7C illustrate a third example of pulses during performance of a given gate between superconducting qubits, according to some embodiments.

In this third example, type of gate 120 may be a controlled-Z (CZ) gate, wherein the controlled-Z gate is a two-qubit gate and the superconducting qubits are coupled together via a tunable coupler, and therefore pulses for a given pulse profile may resemble the frequency components shown in FIGS. 7A-7C, according to some embodiments. As described above with regard to FIGS. 5A-5C and 6A-6C, the Z frequency components for superconducting qubits 1 and 2 shown in FIG. 7A may represent frequency components of the drive that bring the two superconducting qubits into resonance with one another (via the tunable coupler) for the duration of the controlled-Z gate, according to some embodiments. FIGS. 6B and 6C may represent amplitude modulations of additional Y and X frequency components of the spin locking drive that induce spin locking once superconducting qubits 1 and 2 are on-resonance with one another during performance of the controlled-Z gate, according to some embodiments.

Figures 8A, 8B, 8C:
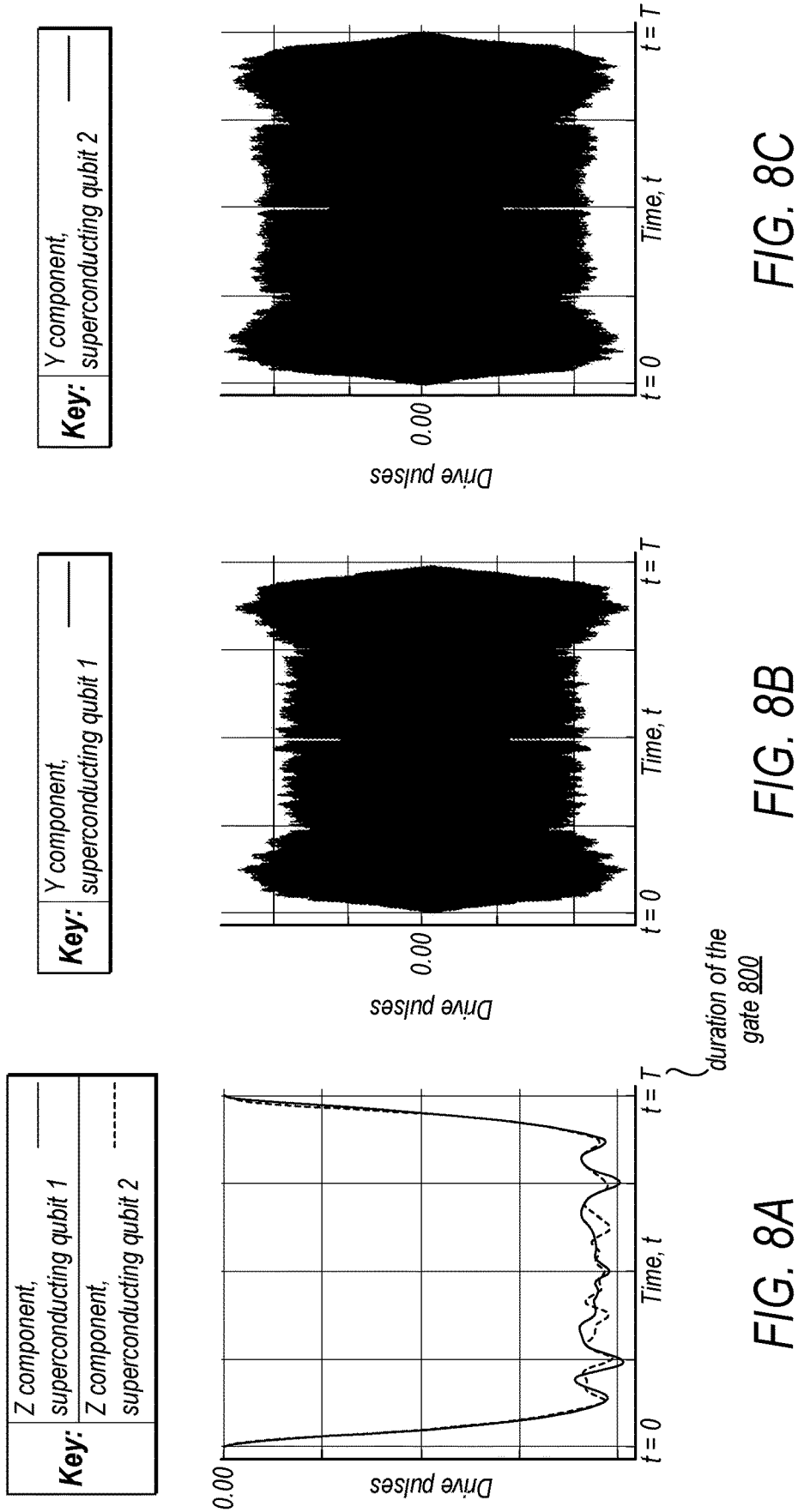
FIGS. 8A-8C illustrate a fourth example of pulses during performance of a given gate between superconducting qubits, according to some embodiments.

FIGS. 8A-8C illustrate a fourth example of pulses during performance of a given gate between superconducting qubits, according to some embodiments.

In some embodiments, FIGS. 8A-8C may represent pulses for a pulse profile for a controlled-Z gate, wherein the controlled-Z gate is a two-qubit gate and the superconducting qubits are coupled together via a tunable coupler, similarly to FIGS. 7A-7C. However, FIGS. 8A-8C represent an example in which one or more conditions of the performance of the gate (such as coherence time of the gate, coupling strengths between the superconducting qubits, non-linearity of the superconducting qubits, average drive amplitude, and exclusion of certain frequency components, etc.) are different from the conditions of the gate described in FIGS. 7A-7C. For example, one or more of inputs 104, 116, 118, 120, 122, 124, and/or 126 may be different in FIGS. 8A-8C with respect to FIGS. 7A-7C, such as coherence time of the gate 122. In such embodiments, duration of the gate 800 may be shorter than duration of the gate 700, for example.

In some embodiments, FIG. 8A may represent Z frequency components of the drive for superconducting qubits 1 and 2 that bring the two superconducting qubits into resonance with one another. FIGS. 8B and 8C may represent Y components of the spin locking drive that induce spin locking for superconducting qubits 1 and 2 once superconducting qubits 1 and 2 are on-resonance with one another during performance of the controlled-Z gate. In addition, in some embodiments of the controlled-Z gate represented by FIGS. 8A-8C, there are no X frequency components of the pulses. As opposed to FIGS. 5B, 5C, 6B, 6C, 7B, and 7C, which may represent amplitude modulations of Y and X frequency components, FIGS. 8B and 8C may represent Y components of the pulses of the spin locking drive for superconducting qubits 1 and 2. In some embodiments, the Y component for superconducting qubit 1 may resemble the actual pulse profile applied to superconducting qubit 1, and the Y component for superconducting qubit 2 may resemble the actual pulse profile applied to superconducting qubit 2.

Figure 9C:
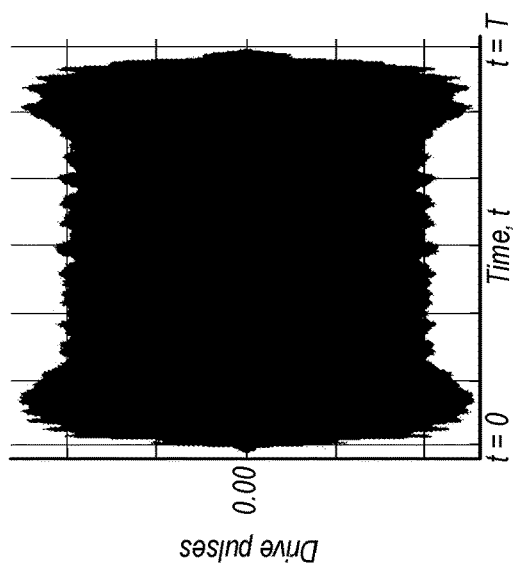
FIGS. 9A-9C illustrate a fifth example of pulses during performance of a given gate between superconducting qubits, according to some embodiments.
Figure 9B:
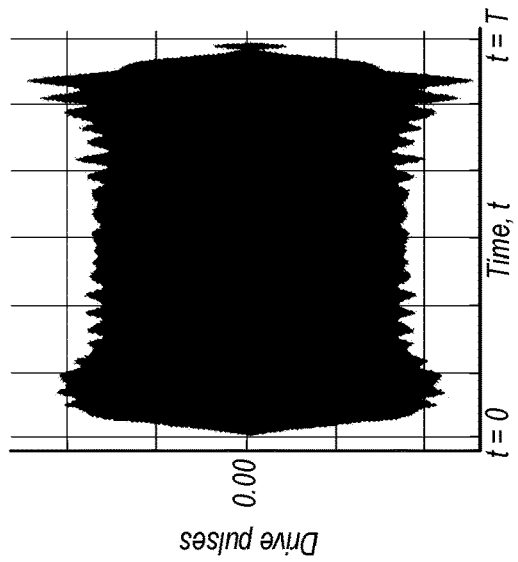
Figure 9A:
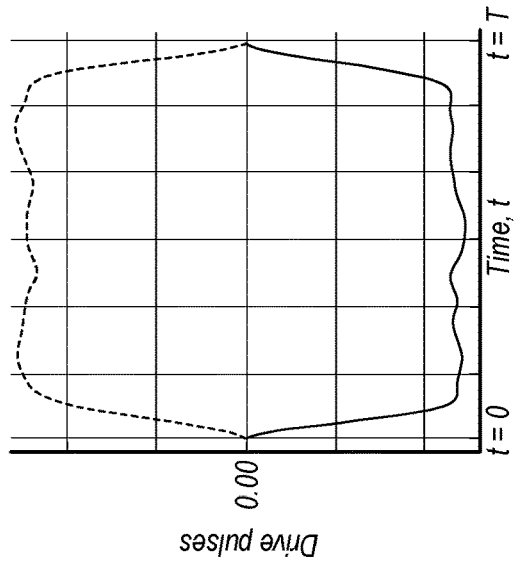

FIGS. 9A-9C illustrate a fifth example of pulses during performance of a given gate between superconducting qubits, according to some embodiments.

In this fifth example, type of gate 120 may be an iSWAP gate, wherein the iSWAP gate is a two-qubit gate and the superconducting qubits are coupled directly together, as opposed to FIGS. 5A-5C, for example, in which the iSWAP gate is a two-qubit gate and the superconducting qubits are coupled together via a tunable coupler. In some embodiments, FIG. 9A may represent Z frequency components of the drive for superconducting qubits 1 and 2 that bring superconducting qubits 1 and 2 into resonance with one another during performance of the gate (e.g., from t=0 to t=duration of the gate 900). In addition, FIGS. 9B and 9C may represent Y components of the pulses of the spin locking drive for superconducting qubits 1 and 2 (e.g., $Y_1$ and $Y_2$, respectively). In some embodiments, such as those shown in FIGS. 9A, 9B, and 9C, there are no X frequency components of the pulses.

Figure 10C:
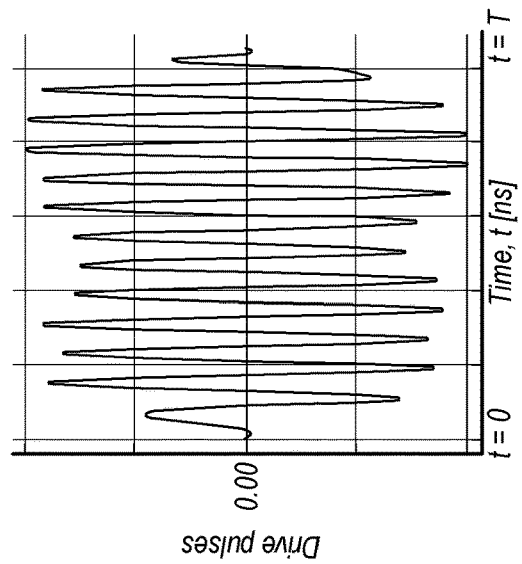
FIGS. 10A-10C illustrate a sixth example of pulses during performance of a given gate between superconducting qubits, according to some embodiments.
Figure 10B:
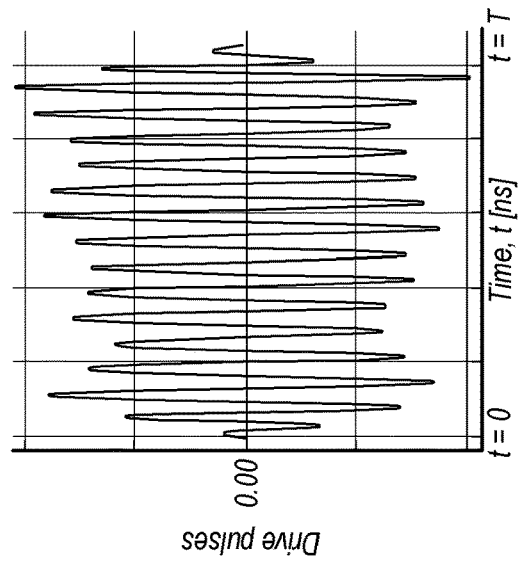
Figure 10A:
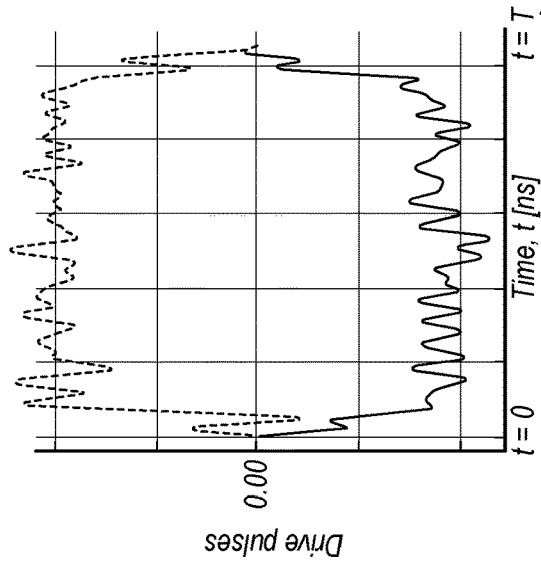

FIGS. 10A-10C illustrate a sixth example of pulses during performance of a given gate between superconducting qubits, according to some embodiments.

In this sixth example, type of gate 120 may be a B-gate, wherein the B-gate is a two-qubit gate and the superconducting qubits are coupled directly together (as opposed to FIGS. 6A-6C, wherein the B-gate is a two-qubit gate and the superconducting qubits are coupled together via a tunable coupler). In addition, duration of the gate 1000 may represent an amount of time that is shorter, longer, or the same as duration of the gate 600. In some embodiments, FIG. 10A may represent Z frequency components of the drive for superconducting qubits 1 and 2 that bring superconducting qubits 1 and 2 into resonance with one another during performance of the gate. In addition, FIGS. 10B and 10C may represent amplitude modulations of Y frequency components for superconducting qubits 1 and 2 (e.g., $Y_1(t)$ and $Y_2(t)$, respectively). In some embodiments, FIGS. 10B and 10C may represent amplitude modulations of frequencies that are shifted slightly from the operating frequencies of superconducting qubits 1 and 2. For example, the slight shift from the operating frequency of superconducting qubit 1 may be written as $\omega_1 \pm \delta$, such that amplitude modulation $Y_1(t)$ may refer to the an amplitude modulation of $Y_1(t)$ cos $([\omega_1 \pm \delta]t)$. Similarly, the slight shift from the operating frequency of superconducting qubit 2 may be written as $\omega_2 \pm \delta$, such that amplitude modulation $Y_2(t)$ may refer to the an amplitude modulation of $Y_2(t)$ cos $([\omega_2 \pm \delta]t)$, according to some embodiments. In some embodiments, such as those shown in FIGS. 10A, 10B, and 10C, there are no X frequency components of the pulses.

It should be understood by a person having ordinary skill in the art that, although the terms first, second, third, etc., may be used herein to describe various examples of pulses during performance of various gates between superconducting qubits (e.g., FIGS. 5A-10C), these examples should not be limited by these terms. These terms are only used to distinguish one example from another, and are not meant to imply any hierarchy of preferred examples or embodiments of pulses applied during the various gates described by FIGS. 5A-10C.

FIG. 11 illustrates an example of a quantum device comprising a quantum waveguide configuration which may be subjected to a spin locking drive during performance of a gate between superconducting qubits implemented using the quantum device, according to some embodiments.

In some embodiments, the quantum hardware that is being subjected to the drive that induces spin locking may comprise a quantum device with a waveguide-type geometry, as shown in FIG. 11. A quantum device with a waveguide-type geometry may refer to tunable couplers (e.g., harmonic oscillators) coupled in series with one another, which are also respectively coupled to superconducting qubits via capacitors, such as in quantum waveguide 1100. As the name suggests, coupling harmonic oscillators in series with one another effectively may cause the quantum device to behave like a waveguide, creating an "effective" coupling between the superconducting qubits. In such embodiments in which the superconducting qubits are transmons, the transmons may be referred to as being close to the band-edge of the harmonic oscillators that are coupled in series with one another. Quantum waveguide 1100 may also be referred to as an analog quantum device or an analog simulator, according to some embodiments.

In the embodiments of quantum waveguide 1100 shown in FIG. 11, harmonic oscillator 1110, harmonic oscillator 1112, harmonic oscillator 1114, and harmonic oscillator 1116 are coupled in series with one another via capacitors 1118, 1120, and 1122, respectively. In addition, harmonic oscillator 1110 may be coupled to superconducting qubit 1102 via capacitor 1126, harmonic oscillator 1112 may be coupled to superconducting qubit 1104 via capacitor 1128, harmonic oscillator 1114 may be coupled to superconducting qubit 1106 via capacitor 1130, and harmonic oscillator 1116 may be coupled to superconducting qubit 1108 via capacitor 1132. In some embodiments, capacitors 1126, 1128, 1130, and 1132 may have capacitance $C_g$, which may refer to quantum waveguide 1100 as having coupling strength g between the superconducting qubits and the harmonic oscillators of the respective quantum waveguide. Furthermore, in some embodiments, harmonic oscillators 1110, 1112, 1114, and 1116, and capacitors 1118, 1120, and 1122 may refer to a quantum metamaterial, such as quantum metamaterial 1124.

In some embodiments, as shown in FIG. 11, four harmonic oscillators are respectively coupled to one another and to four respective superconducting qubits. However, a person having ordinary skill in the art should understand that any number of harmonic oscillators and respectively coupled superconducting qubits may be used to implement quantum waveguide 1100 using the configurations shown.

In some embodiments, superconducting qubits 1102, 1104, 1106, and 1108 may resemble superconducting qubits 402 and 404 and the functionalities used to describe superconducting qubits 402 and 404 herein. In some embodiments, superconducting qubits 1102, 1104, 1106, and 1108 may be referred to as being "tunable" superconducting qubits. It may be advantageous to use tunable superconducting qubits in implementations such as quantum waveguide 1100 due to the coherence time of tunable superconducting qubits and their applicability to single qubit, two-qubit, and multi-qubit gates. In some embodiments, tunable superconducting qubits may be referred to as "tunable" due to the tunable nature of their respective energy gaps (e.g., their respective energy gaps may be modulated and/or varied with time).

In some embodiments, a two-qubit gate, for example, may be performed between two superconducting qubits of quantum waveguide 1100, and a drive which induces spin locking during performance of said two-qubit gate, such as drives 130, 408, and 410, may induce spin locking via one or more pulses having pulse profiles directed at the chosen two superconducting qubits of quantum waveguide 1100. In some embodiments, the coupling strengths between respective pairs of superconducting qubits shown in FIG. 11 may be equal. However, in other embodiments, one or more of the coupling strengths between respective pairs of the superconducting qubits may be different from one another. In addition, the pulses applied to the two superconducting qubits of quantum waveguide 1100 may resemble pulses described in FIGS. 5A-10C, and/or may have the functionalities of the pulses described in FIGS. 5A-10C, according to some embodiments.

FIG. 12 illustrates a quantum low-density parity-check code configured to perform a gate that is implemented using a spin locking drive, according to some embodiments.

In some embodiments, the system and methods described herein may be applied when performing syndrome measurements for a quantum low-density parity-check code, such as quantum low-density parity-check code 1234. In some embodiments, quantum low-density parity-check code 1234 may represent a 2D toric code on a square lattice with open boundary conditions, such as a rotated surface code, comprising qubits, such as qubits 1236 and 1238. However, other embodiments of topological quantum codes, repetition codes, or surface codes may similarly be implemented (e.g., 9-qubit Shor's code, surface code with a twist, XZZX surface code, Pauli code, etc.).

Furthermore, in some embodiments such as the one shown in FIG. 12, a gate, such as superconducting qubit gate 1200, may be performed between qubits, such as qubits 1236 and 1238, of quantum low-density parity-check code 1234. In some embodiments, superconducting qubit gate 1200 may resemble superconducting qubit gate 400 and the functionalities related to superconducting qubit gate 400 described herein. In such embodiments, superconducting qubit gate 1200 is performed between superconducting qubits 1202 and 1204 (e.g., transmons) that are capacitively coupled to tunable coupler 1206 via coupling strengths determined by capacitances 1220 and 1222. Superconducting qubits 1202 and 1204 may be defined by Josephson circuits that comprise Josephson subcircuits 1224 and 1226, and capacitances 1228 and 1230, respectively. Additionally in such embodiments, superconducting qubits 1202 and 1204 may be driven via pulses 712 having pulse profile 1214 and pulses 1216 having pulse profile 1218, respectively, emitted by drives 1208 and 1210. Superconducting qubits 1202 and 1204, and tunable coupler 1206 are connected to ground 1232.

In some embodiments, superconducting qubit gate 1200 may take place during a given round of a plurality of rounds of syndrome measurements. In such embodiments, other gates besides superconducting qubit gate 1200 may take place during the same given round of syndrome measurements using qubits other than qubits 736 and 1238 on quantum low-density parity-check code 1234. Similarly, another configuration similar to superconducting qubit gate 1200 may take place during another round of the syndrome measurements utilizing qubits other than qubits 1236 and 1238, according to some embodiments. In such embodiments, one or more pulse profiles may be generated for each configuration of superconducting qubit gate 1200, and may be used to drive the respective gate via one or more drives configured to control one or more gates of quantum low-density parity-check code 1234 during the rounds of syndrome measurements. The pulses applied to superconducting qubits 1202 and 1204 during performance of superconducting qubit gate 1200 may resemble pulses described in FIGS. 5A-10C, and/or may have the functionalities of the pulses described in FIGS. 5A-10C, according to some embodiments.

Illustrative Computer System

Figure 13:
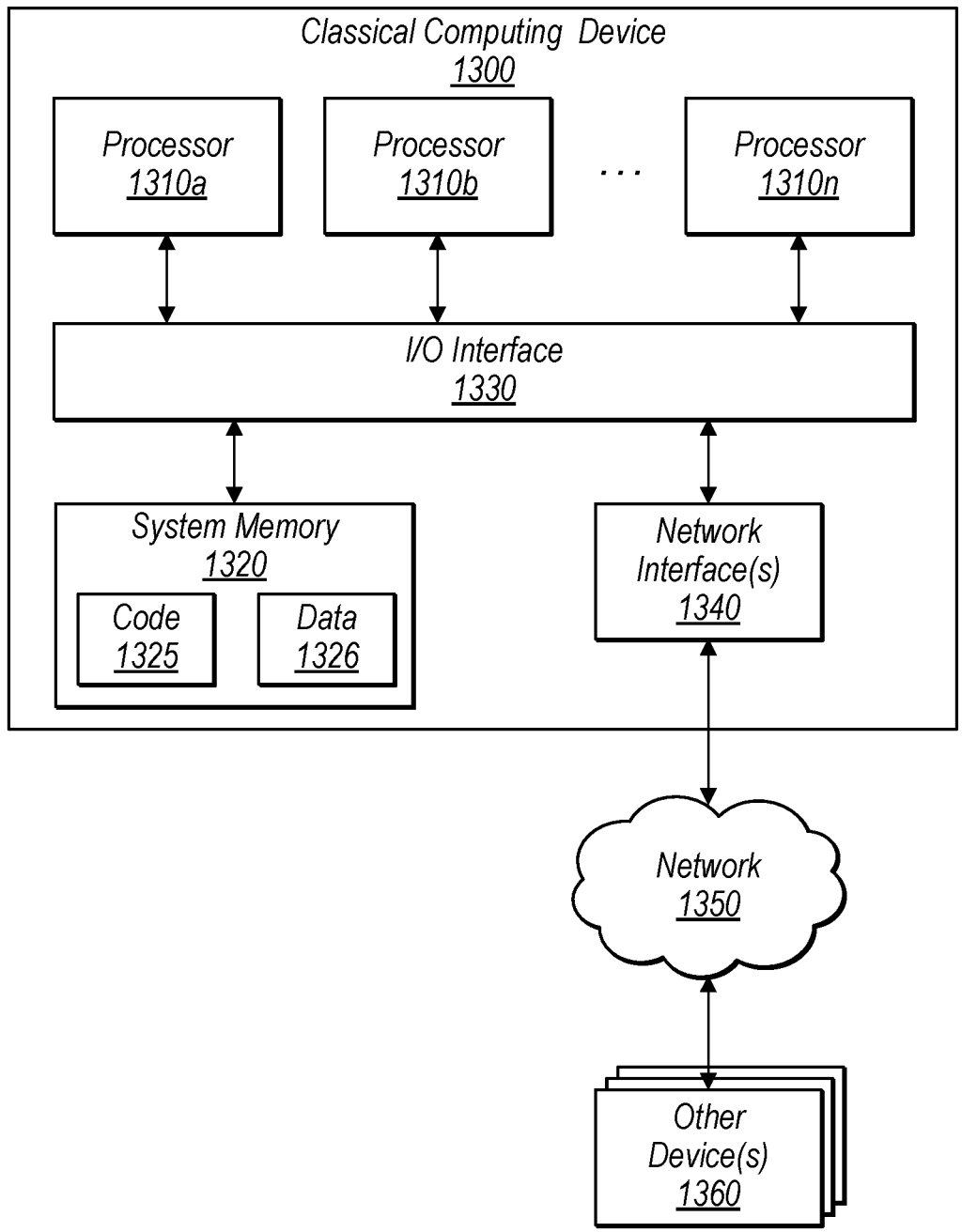
FIG. 13 is a block diagram illustrating an example classical computing device that may be used in at least some embodiments.

FIG. 13 is a block diagram illustrating an example classical computing device that may be used in at least some embodiments.

FIG. 13 illustrates such a general-purpose classical computing device 1300 as may be used in any of the embodiments described herein. In the illustrated embodiment, classical computing device 1300 includes one or more processors 1310 coupled to a system memory 1320 (which may comprise both non-volatile and volatile memory modules) via an input/output (I/O) interface 1330. Classical computing device 1300 further includes a network interface 1340 coupled to I/O interface 1330.

In various embodiments, classical computing device 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA. In some implementations, graphics processing units (GPUs) may be used instead of, or in addition to, conventional processors.

System memory 1320 may be configured to store instructions and data accessible by processor(s) 1310. In at least some embodiments, the system memory 1320 may comprise both volatile and non-volatile portions; in other embodiments, only volatile memory may be used. In various embodiments, the volatile portion of system memory 1320 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 1320 as code 1325 and data 1326.

In some embodiments, I/O interface 1330 may be configured to coordinate I/O traffic between processor 1310, system memory 1320, and any peripheral devices in the device, including network interface 1340 or other peripheral interfaces such as various types of persistent and/or volatile storage devices. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between classical computing device 1300 and other devices 860 attached to a network or networks 850, such as other computer systems or devices as illustrated in FIG. 1A through FIG. 12, for example. In various embodiments, network interface 1340 may support communication via any suitable wired or wireless general data networks, such as types of Ethernet network, for example. Additionally, network interface 1340 may support communication via telecommunications/telephony networks such as analog voice networks or digital fiber communications networks, via storage area networks such as Fibre Channel SANs, or via any other suitable type of network and/or protocol.

In some embodiments, system memory 1320 may represent one embodiment of a computer-accessible medium configured to store at least a subset of program instructions and data used for implementing the methods and apparatus discussed in the context of FIG. 1A through FIG. 12. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to classical computing device 1300 via I/O interface 1330. A non-transitory computer-accessible storage medium may also include any volatile or non-volatile media such as RAM (e.g., SDRAM, DDR SDRAM, RDRAM, SRAM, etc.), ROM, etc., that may be included in some embodiments of classical computing device 1300 as system memory 1320 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 1340. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "classical computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
    two or more superconducting qubits coupled together via one or more tunable couplers;
    a drive configured to:
        induce spin locking, via application of a plurality of pulses, during performance of a gate between two of the two or more superconducting qubits; and
    one or more classical computing devices configured to determine a pulse profile for the plurality of pulses, wherein to determine the pulse profile the one or more classical computing devices are configured to:
        determine, via optimal coherence control methods, a subset of frequency components producible via the drive that cause leakage outside of respective code spaces of the two or more superconducting qubits;
        exclude the subset of the frequency components producible via the drive from the pulse profile; and
        provide the resulting pulse profile to be applied by the drive,
    wherein the drive is further configured to apply the plurality of pulses having the provided pulse profile to induce the spin locking during the performance of the gate.

2. The system of claim 1, wherein the two or more superconducting qubits are transmons.

3. The system of claim 1, wherein the one or more tunable couplers are harmonic oscillators, anharmonic oscillators, or tunable superconducting qubits.

4. The system of claim 1, wherein the drive is further configured to apply the plurality of pulses having the provided pulse profile continuously to induce the spin locking during the performance of the gate.

5. The system of claim 1, wherein the two or more superconducting qubits of the system comprise one or more additional superconducting qubits in addition to the two superconducting qubits between which the gate is performed, wherein the two or more superconducting qubits and the one or more additional superconducting qubits are respectively coupled to one another via respective ones of the one or more tunable couplers.

6. The system of claim 1, wherein, prior to the performance of the gate, the one or more tunable couplers are detuned from operating frequencies of the two or more superconducting qubits, and wherein the two or more superconducting qubits are detuned from one another such that respective ones of the two or more superconducting qubits have different respective operating frequencies.

7. The system of claim 6, wherein the one or more classical computing devices are further configured to determine the subset of frequency components that cause the leakage outside of the respective code spaces based at least in part on the operating frequencies of the two or more superconducting qubits.

8. A method, comprising:
    determining a pulse profile for a plurality of pulses to be applied, by a drive, on quantum hardware comprising superconducting qubits during performance of a gate such that spin locking is induced for a set of superconducting qubits, of the superconducting qubits of the quantum hardware, between which the gate is performed; and
    performing the gate, wherein said performing comprises:
        applying the plurality of pulses having the determined pulse profile to induce the spin locking.

9. The method of claim 8, wherein:
    the quantum hardware comprises harmonic oscillators coupled in series with one another; and
    the harmonic oscillators are respectively coupled to the superconducting qubits.

10. The method of claim 8, wherein the quantum hardware comprises the superconducting qubits coupled together via one or more tunable couplers.

11. The method of claim 8, further comprising:
    determining or receiving operating frequencies for the set of superconducting qubits, wherein, prior to said performing the gate, the set of superconducting qubits are detuned from one another such that respective superconducting qubits of the set of superconducting qubits have different respective operating frequencies; and
    wherein in said determining the pulse profile the pulse profile is determined based, at least in part, on the determined or received operating frequencies for the set of superconducting qubits.

12. The method of claim 8, further comprising:
    determining or receiving a noise model for the gate, wherein in said determining the pulse profile the pulse profile is determined based, at least in part, on the determined or received noise model for the gate.

13. The method of claim 8, further comprising:
    determining or receiving a known minimum coherence time of the set of superconducting qubits during the performance of the gate, wherein in said determining the pulse profile the pulse profile is determined based, at least in part, on the determined or received known minimum coherence time of the set of superconducting qubits during the performance of the gate.

14. The method of claim 8, further comprising:
    receiving or performing a simulation of the performance of the gate; and
    determining a simulated coherence time of the set of superconducting qubits during the performance of the gate using the simulation, wherein in said determining the pulse profile the pulse profile is determined based, at least in part, on the simulated coherence time of the set of superconducting qubits during the performance of the gate.

15. The method of claim 8, wherein:
    the superconducting qubits of the quantum hardware are part of a quantum low-density parity-check code; and
    the gate is performed during a given round of a plurality of rounds of syndrome measurements.

16. The method of claim 8, wherein:
the superconducting qubits of the quantum hardware store logical data; and
the gate is performed as part of a logical gate operation.

17. The method of claim 8, further comprising:
determining another pulse profile for another plurality of pulses to be applied by the drive during performance of another gate such that spin locking is induced for another set of superconducting qubits of the superconducting qubits of the quantum hardware between which the other gate is performed, wherein the other pulse profile is different from the pulse profile; and
applying the other plurality of pulses having the determined other pulse profile to induce the spin locking for the other set of superconducting qubits between which the other gate is performed.

18. One or more non-transitory, computer-readable storage media storing program instructions that when executed on or across one or more processors, cause the one or more processors to:
determine a pulse profile for a plurality of pulses to be applied, by a drive, on quantum hardware comprising superconducting qubits during performance of a gate such that spin locking is induced for a set of superconducting qubits of the superconducting qubits between which the gate is performed, wherein, to determine the pulse profile, the program instructions further cause the one or more processors to:
determine, via optimal coherence control methods, a subset of frequency components that cause leakage outside of respective code spaces of the set of superconducting qubits;
exclude the subset of the frequency components from the pulse profile; and
provide drive control instructions comprising the resulting pulse profile to the drive.

19. The one or more non-transitory, computer-readable storage media of claim 18, wherein the program instructions further cause the one or more processors to:
determine or receive a noise model for the quantum hardware, wherein said determine, via optimal coherence control methods, the subset of frequency components that cause leakage outside of respective code spaces of the set of superconducting qubits is determined based, at least in part, on the noise model for the quantum hardware.

20. The one or more non-transitory, computer-readable storage media of claim 18, wherein the program instructions further cause the one or more processors to:
determine or receive a known minimum coherence time of the set of superconducting qubits during the performance of the gate, wherein said determine, via optimal coherence control methods, the subset of frequency components that cause leakage outside of respective code spaces of the set of superconducting qubits is determined based, at least in part, on the determined or received known minimum coherence time of the set of superconducting qubits during the performance of the gate.

\* \* \* \* \*